US009166782B2

(12) United States Patent
Boren et al.

(10) Patent No.: US 9,166,782 B2
(45) Date of Patent: Oct. 20, 2015

(54) DYNAMIC DISTRIBUTED KEY SYSTEM AND METHOD FOR IDENTITY MANAGEMENT, AUTHENTICATION SERVERS, DATA SECURITY AND PREVENTING MAN-IN-THE-MIDDLE ATTACKS

(76) Inventors: Stephen Laurence Boren, Vancouver (CA); Andre Jacques Brisson, Vancouver (CA)

( * ) Notice: Subject to any disclaimer, the term of this patent is extended or adjusted under 35 U.S.C. 154(b) by 1435 days.

(21) Appl. No.: 12/297,884

(22) PCT Filed: Apr. 25, 2007

(86) PCT No.: PCT/CA2007/000700
§ 371 (c)(1),
(2), (4) Date: Nov. 19, 2008

(87) PCT Pub. No.: WO2007/121587
PCT Pub. Date: Nov. 1, 2007

(65) Prior Publication Data
US 2009/0106551 A1 Apr. 23, 2009

Related U.S. Application Data

(60) Provisional application No. 60/803,930, filed on Jun. 5, 2006, provisional application No. 60/794,522, filed on Apr. 25, 2006.

(51) Int. Cl.
*G06F 21/00* (2013.01)
*H04L 9/08* (2006.01)
(Continued)

(52) U.S. Cl.
CPC .............. *H04L 9/083* (2013.01); *H04L 9/0822* (2013.01); *H04L 9/321* (2013.01); *H04L 9/3226* (2013.01); *H04L 63/0428* (2013.01)

(58) Field of Classification Search
CPC ....... H04L 9/083; H04L 63/02; H04L 63/029; H04L 63/062; H04L 63/0823; H04L 63/0428; H04L 9/0825; H04K 1/00
See application file for complete search history.

(56) References Cited

U.S. PATENT DOCUMENTS

| 5,371,796 A | 12/1994 | Avarne |
| 6,633,979 B1 | 10/2003 | Smeets |

(Continued)

FOREIGN PATENT DOCUMENTS

| WO | 99/18692 A1 | 4/1999 |
| WO | 0169843 A2 | 9/2001 |

(Continued)

OTHER PUBLICATIONS

International Search Report completed on Aug. 15, 2007 in respect of Patent Cooperation Treaty Application No. PCT/CA2007/000700 (Publ. No. WO 2007/121587).

(Continued)

*Primary Examiner* — Michael S McNally
*Assistant Examiner* — Carlton Johnson
(74) *Attorney, Agent, or Firm* — Bruce M. Green; Oyen Wiggs Green & Mutala LLP

(57) ABSTRACT

A distributed key encryption system and method is provided in which a key storage server provides a session key to the source and destination computers by encrypting the session key with unique distributed private keys that are associated with the respective source and destination computers by unique private key identifiers The destination computer then decrypts the encrypted session key using it's distributed private key and then decrypts the communication using the decrypted session key.

13 Claims, 12 Drawing Sheets

(51) Int. Cl.
*H04L 9/32* (2006.01)
*H04L 29/06* (2006.01)

(56) References Cited

U.S. PATENT DOCUMENTS

| | | | |
|---|---|---|---|
| 7,190,791 | B2 | 3/2007 | Boren et al. |
| 7,242,772 | B1 | 7/2007 | Tehranchi |
| 7,333,611 | B1 | 2/2008 | Yuen et al. |
| 7,389,412 | B2 * | 6/2008 | Sharma et al. ............... 713/153 |
| 2003/0021417 | A1 | 1/2003 | Vasic et al. |
| 2003/0091193 | A1 | 5/2003 | Bunimov et al. |
| 2004/0096056 | A1 * | 5/2004 | Boren et al. ................. 380/28 |
| 2005/0125684 | A1 | 6/2005 | Schmidt |
| 2006/0018474 | A1 * | 1/2006 | Hori et al. ................... 380/255 |
| 2006/0213975 | A1 * | 9/2006 | Krishnan et al. ............ 235/380 |
| 2006/0274856 | A1 * | 12/2006 | Dunn et al. .................. 375/316 |
| 2006/0274899 | A1 * | 12/2006 | Zhu et al. .................... 380/281 |

FOREIGN PATENT DOCUMENTS

| | | |
|---|---|---|
| WO | 03/079607 A1 | 9/2003 |
| WO | 2005/076521 A1 | 8/2005 |
| WO | 2005076521 A1 | 8/2005 |

OTHER PUBLICATIONS

Supplementary European Search Report dated Mar. 27, 2012 for EP Appl. No. 07719626.9 in the name of Boren, Stephen Laurence, et al.

* cited by examiner

KeyVault Process

KeyVault Classes

| Key |
|---|
| +ftype[3] : char |
| +version : char |
| +uid : long |
| +offset : long |
| +scpcrc : long |
| -length : int |
| -initialized : bool |
| +setLength(in l : unsigned int) : void |

| KeyVault |
|---|
| -initialized : bool |
| +quitstate : bool* |
| -listensocket : unsigned int |
| -serveraddress |
| -clientaddress |
| -keyvaultip[4] : unsigned short |
| -keys map<long long, map<long, Key>> |
| +saveKeyToDrive(in key : Key, in dstserial : unsigned long, in srcserial : unsigned long) : bool |
| -getKey(in dstserial : unsigned long, in srcserial : unsigned long) : Key |
| -addKey(in key : Key, in dstserial : unsigned long, in srcserial : unsigned long) : bool |
| -removeKey(in key : Key, in dstserial : unsigned long, in srcserial : unsigned long) : bool |
| -loadKeyFromDrive(in key : Key, in dstserial : unsigned long, in srcserial : unsigned long) : bool |
| -_sendto(in s : int, in buff : void*, in length : unsigned int, in sockaddr : unsigned int, in tolen : unsigned int) : bool |
| -_recvfrom(in s : int, in buff : void*, in length : unsigned int, in sockaddr : unsigned int, in fromlen : unsigned int) : bool |
| +listen() : bool |
| +init(in q : bool*) : bool |

FIG. 7

3 Authentication and Identity Management configurations with Authentication Server or proxy

1. Peer-to-peer authentication
Each end point is pre-authenticated first by the physical distribution of their key to them or they authenticated through a proxy authentication server first. Communications then become point-to-point. Each endpoint can generate or store their own key segments for comparison; each side can poll the other end point by requesting unique key segments (tokens) or offsets for comparison. Each end point manages keys and offsets. All management is offloaded to the peers.

2. Proxy and/or Un-Trusted Third Party Authentication Server
An endpoint can key generate to authenticate and track their own usage history with a proxy. If the DIVA is always in use, this configuration gives the endpoint (client 1) verified authentication, and deniability or repudiation capability by logging information corresponding usage or access to a third party (in this instance the server or site endpoint. Authentication is only in one direction. It is possible to configure the proxy to be an Un-Trusted Third Party. This proxy would manage offsets and not be privy to user key information. This means if their database is hacked that there is no key information about network users available.

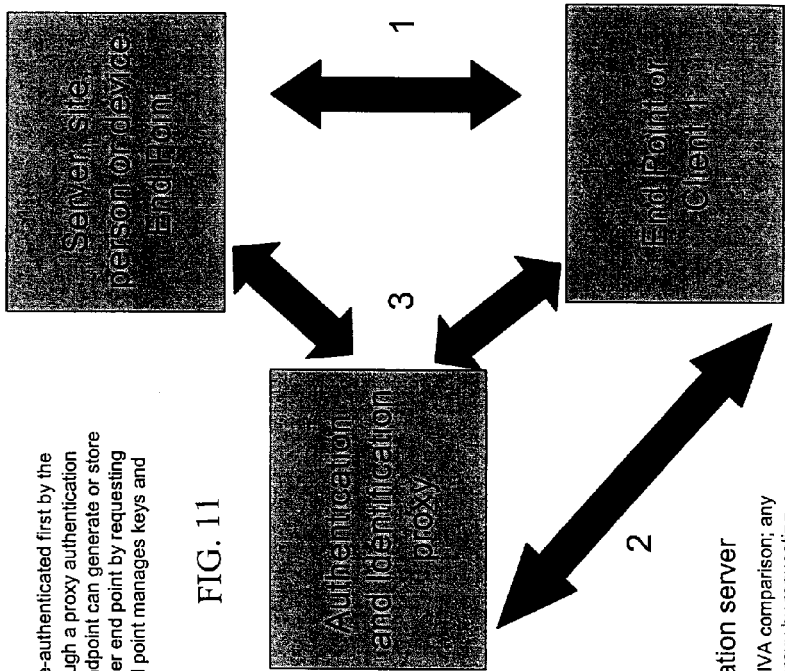

FIG. 11

3. Two way authentication with proxy authentication server
Each endpoint can generate or store their own key segments for DIVA comparison; any endpoint can poll the other endpoints or the authentication server proxy by requesting unique key segments (tokens) or offsets for comparison. An alternate configuration is that the authentication server does all the polling of the endpoints and completely manages the offsets and the authentication process.

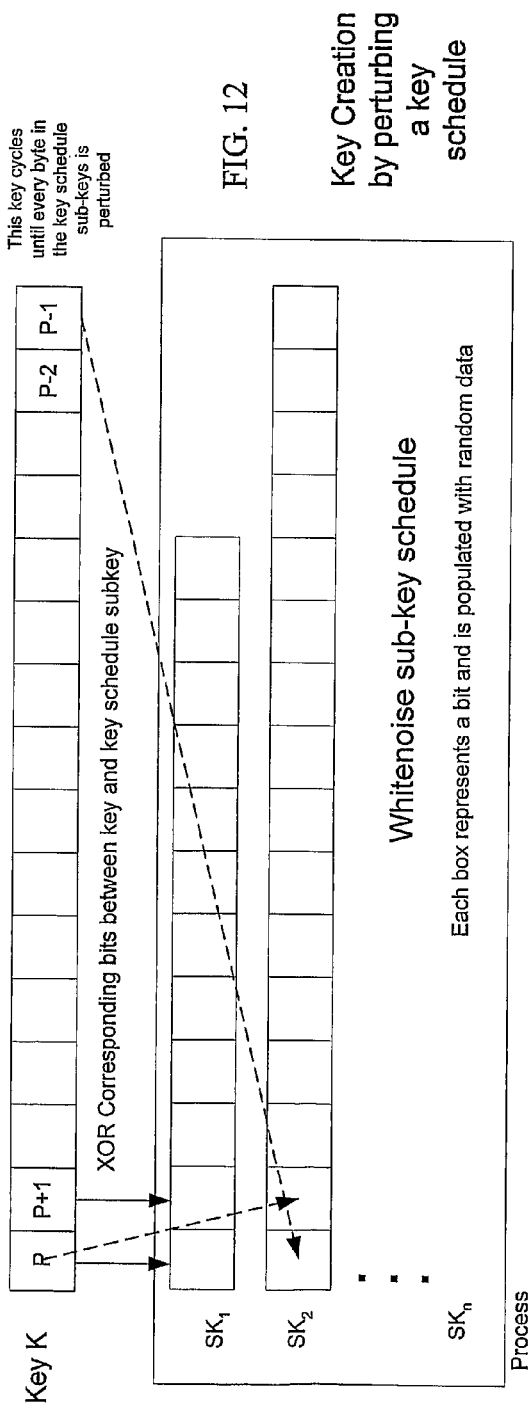

DYNAMIC DISTRIBUTED KEY SYSTEM AND METHOD FOR IDENTITY MANAGEMENT, AUTHENTICATION SERVERS, DATA SECURITY AND PREVENTING MAN-IN-THE-MIDDLE ATTACKS

TECHNICAL FIELD

The invention relates to the field of security for electronic communications and in particular network scaling, authentication and Identity Management, detection, revocation and encryption methods.

BACKGROUND

The most widely used method for providing security online for authentication and encryption is using asymmetrical encryption systems of the public key design where authentication relies on certificates issued by certificate servers. Public Key Infrastructure (PKI) systems have known security vulnerabilities such as being susceptible to Man-in-the-Middle [MitM] attacks, because they are often implemented improperly.

The overhead of the PKI system is high, not just because of all the steps involved in the architecture, but also their choice of cryptography. The encryption strength used by the PKI has been called into question recently. Public keys are compound primes and they are always available for attack. There have been significant strides in prime numbers and factoring theory. New techniques exist to factor compound primes. Fast computers factor compound primes by simplified techniques like the "sieve" method, so what used to take years now can be done in hours. Using progressively stronger keys with public key systems becomes progressively more difficult because of the additional computational overhead introduced as keys get stronger (longer).

There are a number of reasons why security on public key systems is problematic. The Certificate Authority [CA] may not be trustworthy. The private key on a computer may not be protected. It is difficult to revoke keys (refuse network access). Revocation generally requires Third Party intervention. Asymmetric systems are difficult for the average user to understand. Also the cryptographic key information is publicly available to hackers. There are currently no methods of providing continuous, stateful authentication, continuous stateful intrusion detection and automatic denial of network access to hacking and spoofing.

A distributed encryption key is a key that has been pre-distributed by some manual means, such as courier or person to person, to the party involved. This is the most secure method of ensuring key privacy; however this is a problem when new dynamic sessions wish to be established with parties who do not have pre-shared key information.

Any topology or technologies created to provide the highest level of network security must address issues of secure key management, key creation, key exchange, authentication, detection, revocation and authorizations.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Dynamic Distributed Key architectures as described herein address the aforementioned elements and shortcomings of the PKI system. At the topological level, several network topologies are disclosed that use distributed keys as a random number generator to in turn generate additional distributed keys and securely distribute them to additional devices/persons electronically for easily scalable networks and for scaling secure networks over the Internet. Additionally, these distributed keys can generate session keys for use with any encryption algorithm. Although the preferred embodiment use the keys disclosed in U.S. Pat. No. 7,190,791 (hereinafter "Whitenoise keys") for additional key generation (and for all security functions including encryption), this may be accomplished with any deterministic random (pseudo random) data source and any encryption algorithms. Adoption of secure network topologies also relies in some contexts on its ability to leverage existing technologies. As such, a hybrid approach is disclosed that uses the Internet's Secure Socket Layer public key technology to add another layer of abstraction to prevent Man-in-the-Middle attacks.

Just as an automobile requires many different technological components working in harmony, secure networks require several components for effective and secure use and deployment. Disclosed are techniques to provide stateful and continuous authentication, detection and automatic revocation. These components are based on the ability to use a deterministic random (pseudorandom) data source to generate and compare portions of a key stream (key output) that have not yet been created and not yet transmitted. Key segments are compared ahead in the key stream. Secure transmission of keys occurs if they are delivered in an encrypted state and an un-authorized party never has access to all the information required to fashion a break or a successful guess of a key stream segment. This also requires the ability to easily manage offsets so each endpoint knows where in the key to begin key stream segment (token) generation.

Effective techniques exploiting these characteristics of Dynamic Distributed Key topologies are provided to prevent Man-in-the-Middle attacks, provide continuous authentication and detection, and safeguard with automatic revocation. This invention uses a distributed key, not as a key for a point-to-point link, as would traditionally be done, but instead that key is used to distribute encrypted "session" keys to be used for the original intention of establishing secure links of communication. Distributed keys by their nature, not only allow for the encryption of traffic, but also the authentication of the other party. This is an advantage over the PKI, public key infrastructure, system.

The GateKeeper and the Key Vault work together to create a dynamic distributed key environment for TCP/UDP tunneling. The Gatekeeper creates and encrypts tunnels based on simple standard netfilter rules, while the KeyVault facilitates the retrieval of point-to-point keys as required by GateKeepers as they talk to each other.

In short, the system currently facilitates near-transparent, dynamic, encrypted point-to-point communication between networks on a network. The KeyVault and GateKeeper systems work together to create a layer on any IP based network, like the Internet, that allows communications to remain secure and confidential.

The invention provides a dynamic distributed key system. Traditionally distributed key systems require that a key be delivered through courier or in person to each person with whom one wishes to establish a secure link. This invention overcomes this encumbrance. At any time, one can start communicating to someone else that uses the invention without having to wait for a distributed key to be delivered.

The invention therefore provides a method of encrypting a communication between a first source computer and a second destination computer, wherein the source and destination computers are each provided respectively with first and second private distributed keys, each associated with a first and second unique private key identifier, wherein a key storage server is provided with the first and second private distributed keys, each associated with the first and second unique private key identifiers, the method comprising: i) the source computer sending a request to the key storage server for a session key; ii) the key storage server identifying the source computer and locating its associated private distributed key; iii) the key storage server generating a unique session key for the session in question, identified by a unique session identifier; iv) the key storage server encrypting the session key with the source computer private distributed key and sending it, with a session identifier, to the source computer; v) the source computer using the source computer private distributed key to decrypt the session key and using the session key to encrypt the communication, which is sent to the destination computer along with the session identifier; vi) the destination computer receives the encrypted communication and session identifier and sending a request to the key storage server for the session key associated with the session identifier; vii) the key storage server determining from the session identifier whether it has the corresponding session key, and whether it has the destination computer's private distributed key; viii) if the key storage server determines from the session identifier that it has the corresponding session key, and has the destination computer's private distributed key, the key storage server encrypting the session key said destination computer's private distributed key and communicating it to the destination computer; ix) the destination computer then decrypting the session key using its private distributed key and decrypting the communication using the decrypted session key.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 7 is a class diagram for a second component of the process;

FIG. 11 is a schematic illustration of the authentication and identity management configurations according to the process; and FIG. 12 is a schematic illustration of the method of key creation by perturbing a key schedule.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
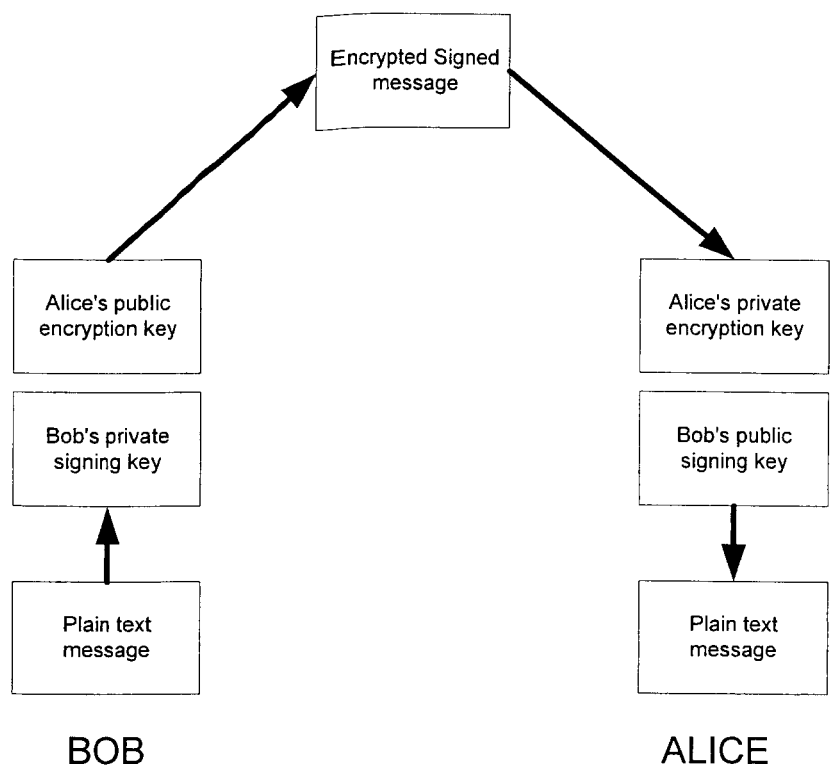
FIG. 1 illustrates the prior art PKI system.

FIG. 1 illustrates the existing public key asymmetric encryption method of encrypting communications between Bob and Alice, which is the most widely used method currently for providing security online for authentication and encryption.

Figure 2:
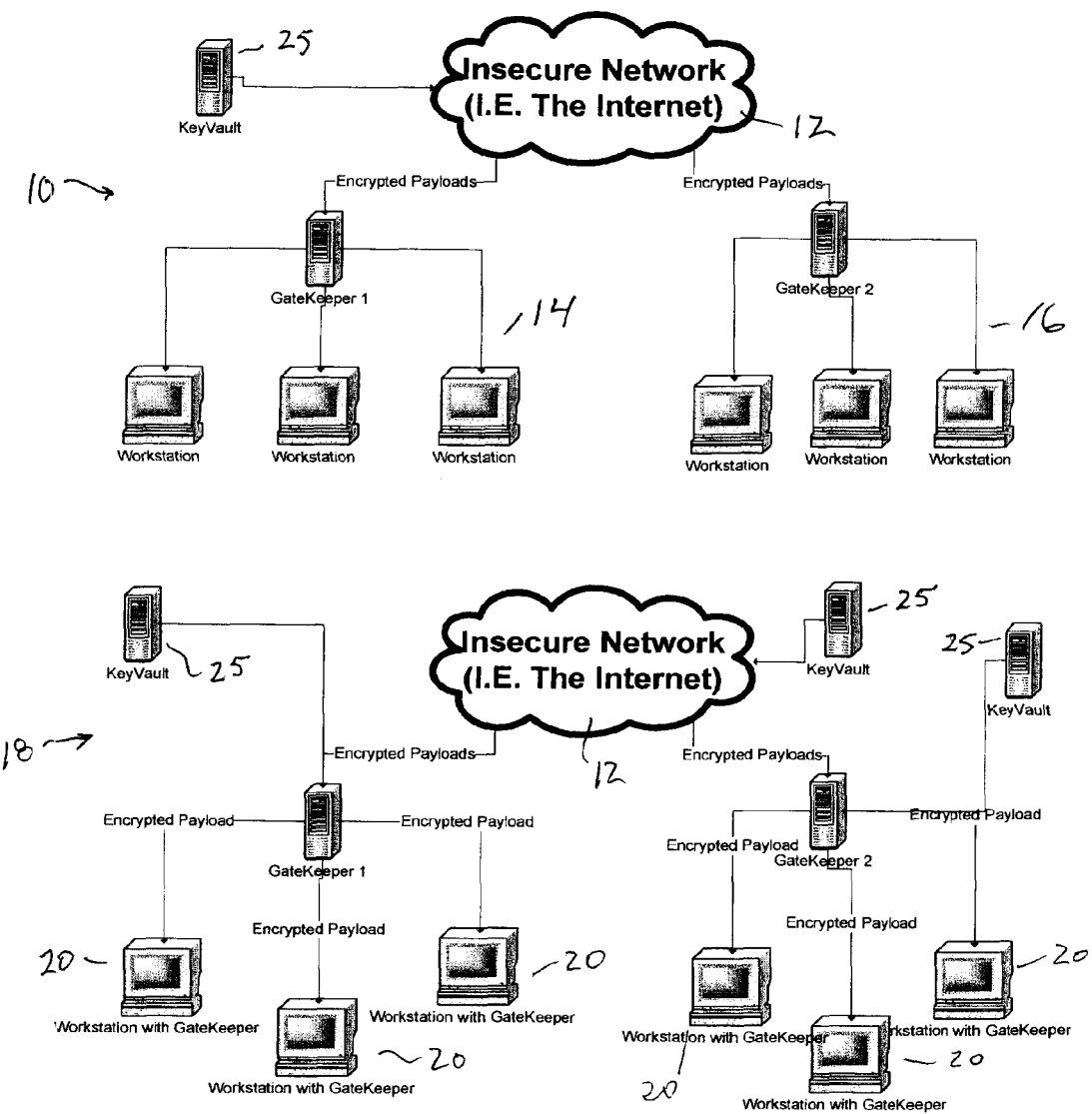
FIG. 2 illustrates possible configurations that could use the invention's secure communication links using traditional computing networks.

FIG. 2 illustrates possible configurations that could use the present invention's secure communication links using traditional computing networks. In arrangement 10, all data sent over the Internet 12 between networks 14 and 16 is encrypted In arrangement 18, all data sent between any workstation with Gatekeeper nodes 20 is encrypted.

In what follows, the two components of the invention are referred to as GateKeeper and KeyVault. GateKeeper is the point to point data link layer tunneling system which uses KeyVault. KeyVault provides keys to GateKeepers as they request them. The preferred encryption algorithm for use in the invention is the Whitenoise Superkey Encryption Algorithm, disclosed in U.S. Pat. No. 7,190,791 and PCT patent application publication no. WO 2005/076521 A1, which are incorporated herein by reference, and which is referred to by the trademark "Whitenoise™".

The GateKeeper and KeyVault servers can be used in any tier of network architectures traveling from IP to IP, whether from computer to computer, or alternatively, from network to network, or computer to network, and wired-to-wired, wireless-to-wired, and wireless-to-wireless. The system is able to plug anywhere into a network because the system relies on the data link layer between systems. Some other encryption systems rely on the application level (SSH is an example of this). When the application level is used, the secure tunnel is application specific and needs to be re-integrated with each application that wishes to utilize it such as VoIP, e-mail, or web surfing. Using the datalink layer instead, allows immediate integration with every IP based application with no delay. The applications do not know that the tunnel is there.

The KeyVault, and the GateKeeper applications can work separately, or as a combination. The GateKeeper tunneling system can be used on its own to only facilitate the traditional notion of static point-to-point tunnels that would be useful for ISPs, governments, embassies, or corporations. The KeyVault architecture to distribute session keys based on a distributed key allowing for point-to-point dynamic connections can be applied on other areas apart from the tunnel. These other areas include cell phones to secure calls; e-mail systems to secure and authenticate e-mails; satellites for military satellite image streaming; peer-to-peer networks like Bit Torrent (many ISPs filter peer-to-peer network traffic and give users a slower throughput on those connections; encrypted traffic however cannot be analyzed).

Figure 3:
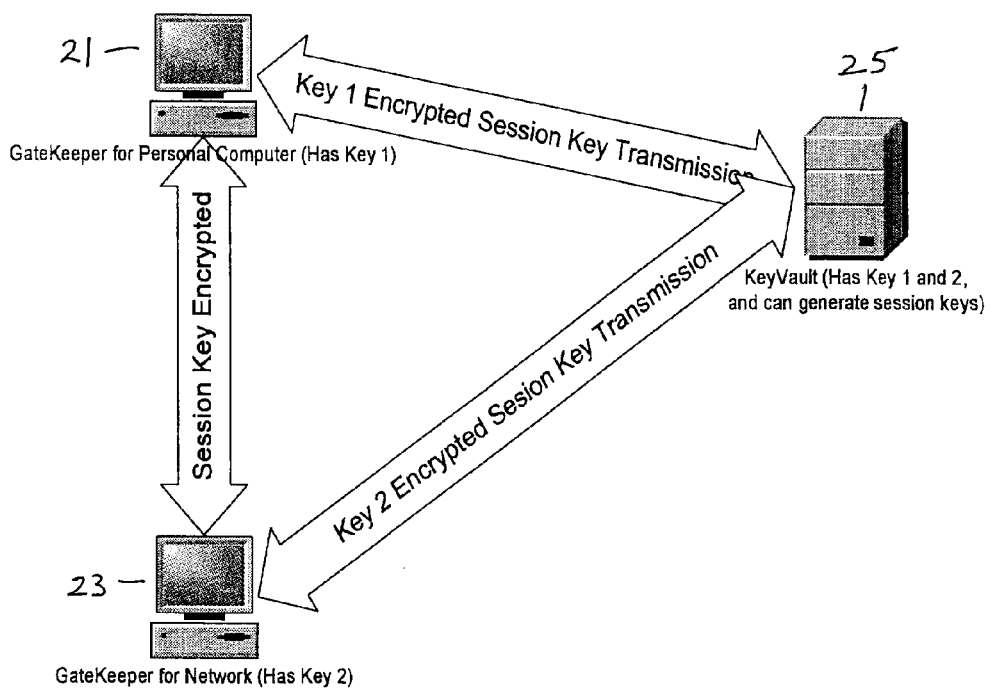
FIG. 3 is a schematic diagram illustrating the system of the invention.

FIG. 3 illustrates schematically the system. Each Gate-Keeper workstation 21, 23 has a unique key-pairing with its Key Vault 25. The two GateKeepers 21, 23 request a session key from the KeyVault using their assigned keys which are assigned physically on installation. They can then communicate with each other using that session key. No single Gate-Keeper can decrypt arbitrary data. When encrypted data needs to be decrypted, only the destination computer can decrypt it, since only the two computers involved in the transmission can obtain the session keys from the KeyVault since the session keys are encrypted by a unique key pairing with the KeyVault.

The GateKeeper client creates and encrypts the request for the session key with the other GateKeeper with its private distributed key that only the KeyVault that holds the session key has a copy of. Only the two GateKeepers involved in the session can request the session key, as their private keys authenticate their requests with the KeyVault.

Figure 4:
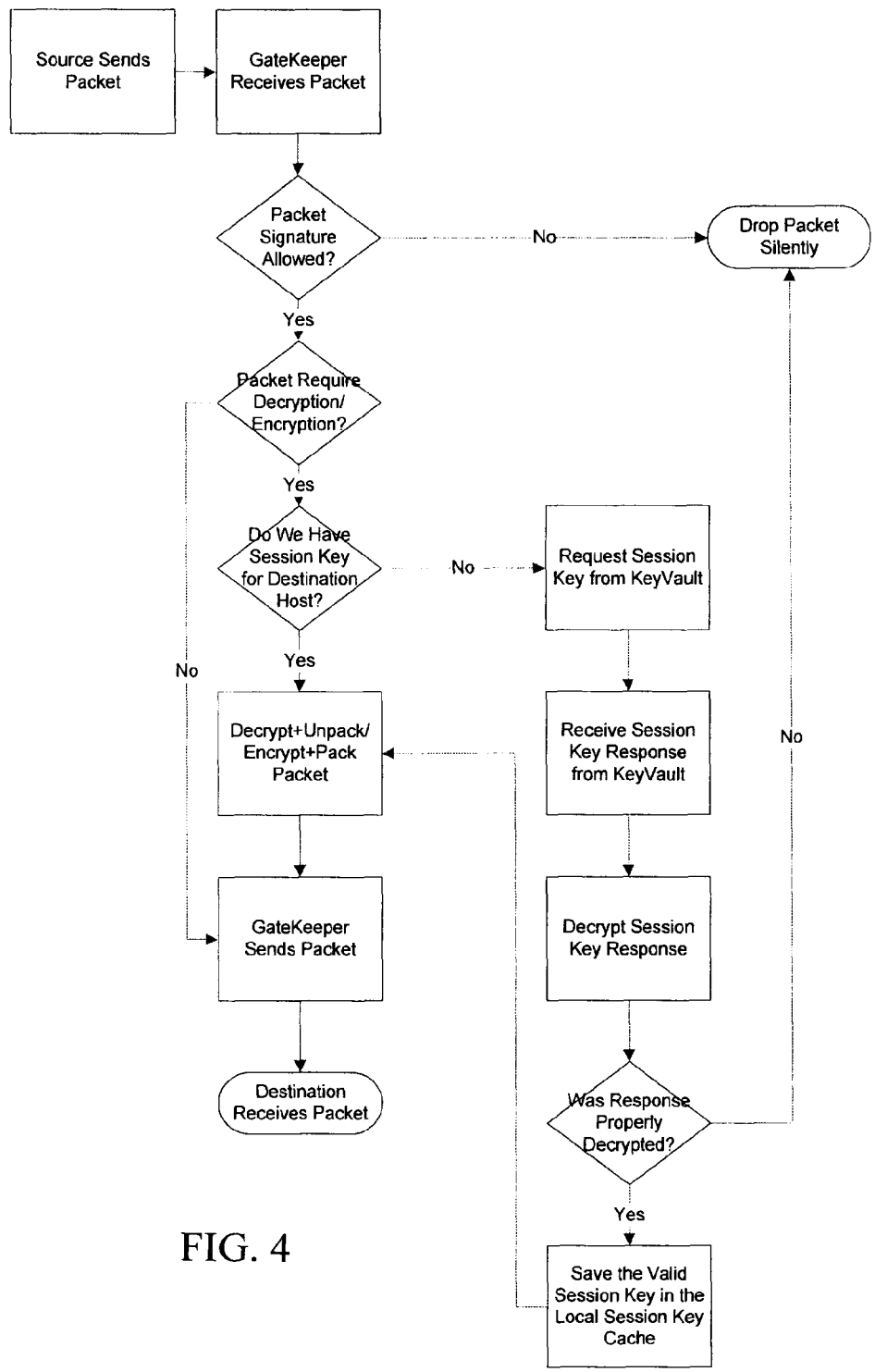
FIG. 4 is a flowchart illustrating one component of the process.
Figure 5:
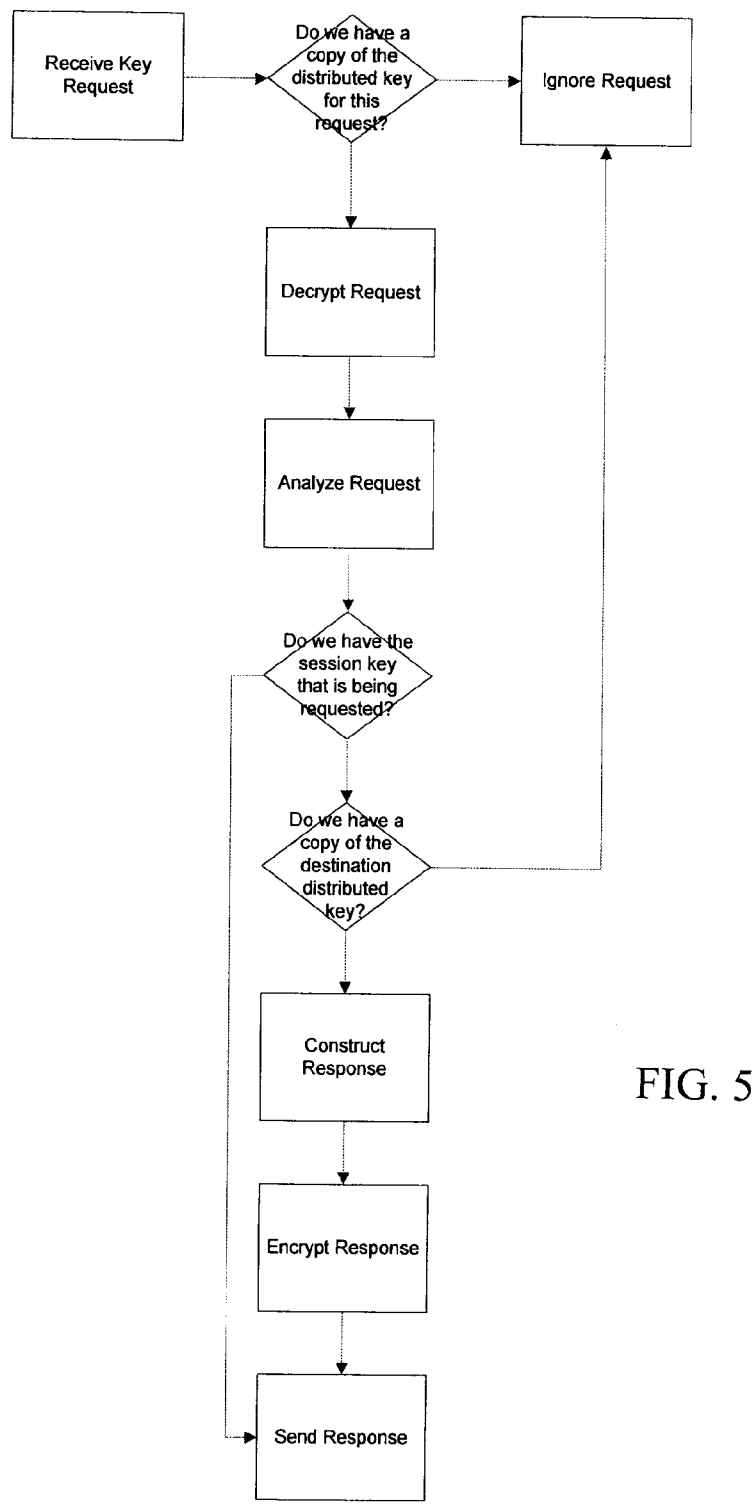
FIG. 5 is a flowchart illustrating a second component of the process.

The sequences of events that drive a secure link start with the GateKeeper on the initiating side, move on to the Key-Vault, and finally end at the receiving side. This can be seen in FIGS. 4 and 5. As seen in FIGS. 4 and 5 detailing the flow of events, in both the GateKeeper and the KeyVault, the two systems work together to form the distributed key system in establishing secure point-to-point communication. The GateKeeper communicates through tunnels to other GateKeepers using existing cached keys, and retrieves any needed session keys from the KeyVault as needed. The KeyVault simply receives and respond to key requests.

With reference to FIGS. 3, 4 and 5, a source Gatekeeper 21 has a private distributed key 1 which is associated with its unique identifier and stored at the KeyVault 25 in connection with that identifier. To commence an encrypted communication with Gatekeeper 23, Gatekeeper 21 sends a request to KeyVault 25 for a session key to. KeyVault 25. KeyVault 25 identifies the sending GateKeeper 21 and locates its associated distributed Key 1. It then generates a unique session key for the session in question, identified by a unique session identifier. It then encrypts the session key with Key 1 and sends it, with the session identifier, to Gatekeeper 21. The source gatekeeper 21 then uses Key 1 to decrypt the session key and uses the session key to encrypt the communication, which is sent to Gatekeeper 23. Gatekeeper 23 receives the packet and determines whether it requires decryption. If it does, it communicates a request to KeyVault 25 for the session key. KeyVault 25 determines from the session identifier whether it has the corresponding session key, and whether it has GateKeeper 23's distributed key 2. If it does, it encrypts the session key using Key 2 and communicates it to GateKeeper 23. GateKeeper 23 then decrypts the session key using its distributed Key 2 and decrypts the communication from GateKeeper 21 using the decrypted session key.

Figure 6:
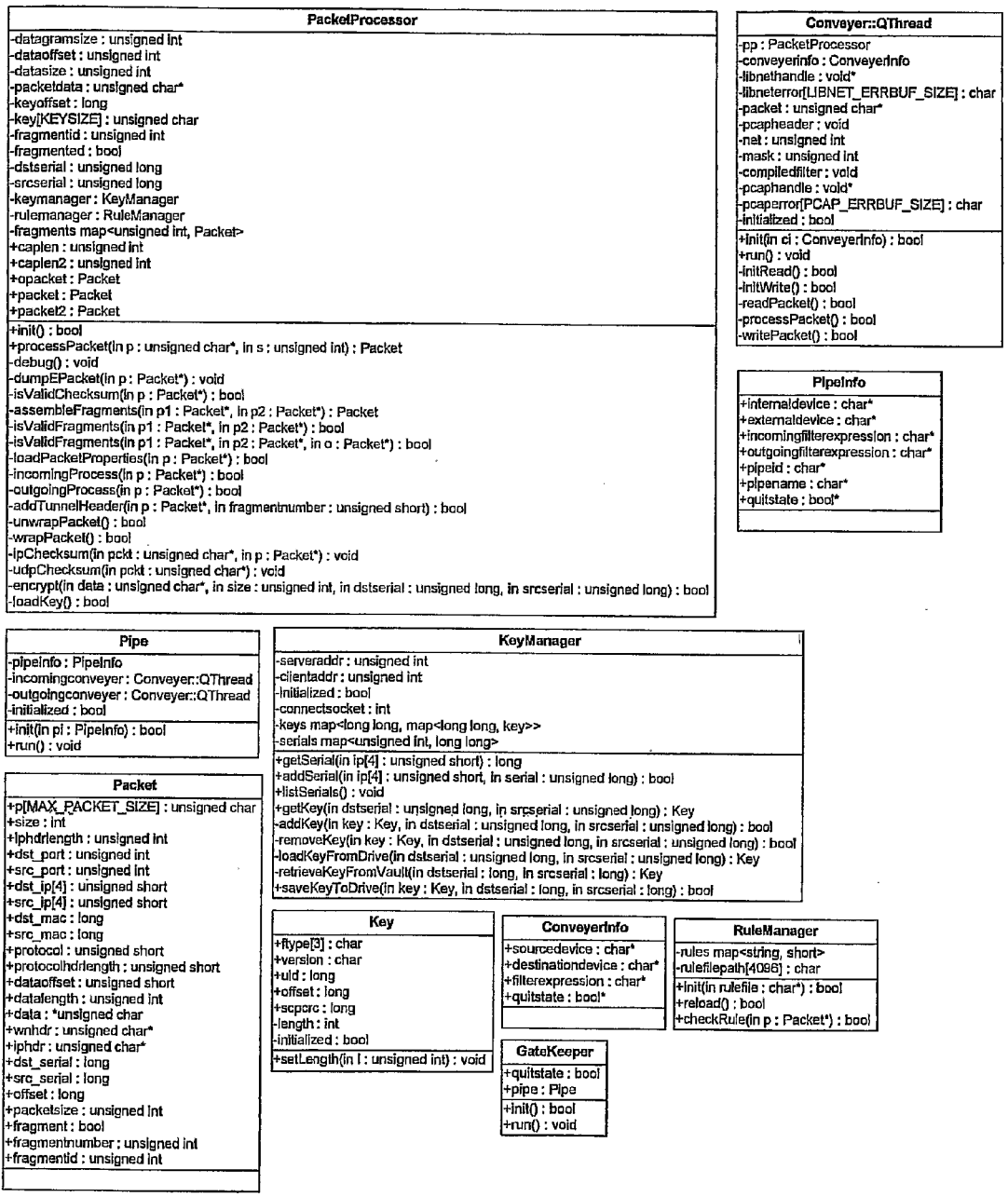
FIG. 6 is a class diagram for one component of the process.

The GateKeeper Class Diagram is shown in FIG. 6. The Gatekeeper application may consist of one or more pipes, each pipe consists of an incoming and outgoing packet conveyor that is responsible for filtering and encrypting the packets based on the rules from the rule manager in their packet processor, retrieving keys as necessary through the key manager. The KeyVault Class Diagram is shown in FIG. 7. The KeyVault application has one main loop that listens for incoming key requests, and fulfills the requests with key responses.

When writing packets, the functions are ordinarily not available unless one initializes libnet in advanced mode as such:

libnethandle=libnet_init(LIBNET_LINK_ADV, conveyerinfo.destinationdevice, libneterror);

As can be seen in the code above, the defined value for LIBNET_LINK_ADV is used to initialize the libnet handle in advanced mode and on the datalink layer.

Also when reading packets, the types of packets read back are determined by a compiled "netfilter" style expression.

pcap_lookupnet(conveyerinfo.sourcedevice, &net, &mask, pcaperror);
pcap_compile(pcaphandle, &compiledfilter, conveyerinfo.filterexpression, 0, net);
pcap_setfilter(pcaphandle, &compiledfilter);

As seen by the code above, a handle to a device one wants to read from, compile, and assign a filter to be used is opened up. This is where one integrates the system with IPTables firewall rules. One could for example ignore any traffic that is on ports 21 and 20 to block common ftp services.

In the PacketProcessor class is where the actual Whitenoise header gets appended to the end of the "wrapped" packet. By "wrapped" is meant that the original packet has been re-encapsulated ready to be encrypted. This encapsulation is the purpose of using a tunnel since encapsulated can be mangled by encryption without making the packet useless in terms of routing.

```
// create a UDP headers
*((unsigned short*)(packet.iphdr + packet.iphdrlength)) =
htons(TUNNEL_PORT);       // src prt
*((unsigned short*)(packet.iphdr + packet.iphdrlength +
2)) = htons(TUNNEL_PORT);    // dst prt
*((unsigned short*)(packet.iphdr + packet.iphdrlength +
4)) = htons(UDP_HEADER_SIZE + datalength1); // lngth
udpChecksum(packet.p);
*((unsigned short*)(packet2.iphdr + packet2.iphdrlength))
= htons(TUNNEL_PORT);       // src prt
*((unsigned short*)(packet2.iphdr + packet2.iphdrlength +
2)) = htons(TUNNEL_PORT);    // dst prt
*((unsigned short*)(packet2.iphdr + packet2.iphdrlength +
4)) = htons(UDP_HEADER_SIZE + datalength2); // lngth
          udpChecksum(packet2.p);
```

The above code shows where the custom-made UDP header gets created to use in the new encapsulated packet. There is a call made to the host to network byte order changing function for short data types, "htons," for the entire information pact into the header bit by bit.

Figure 8:
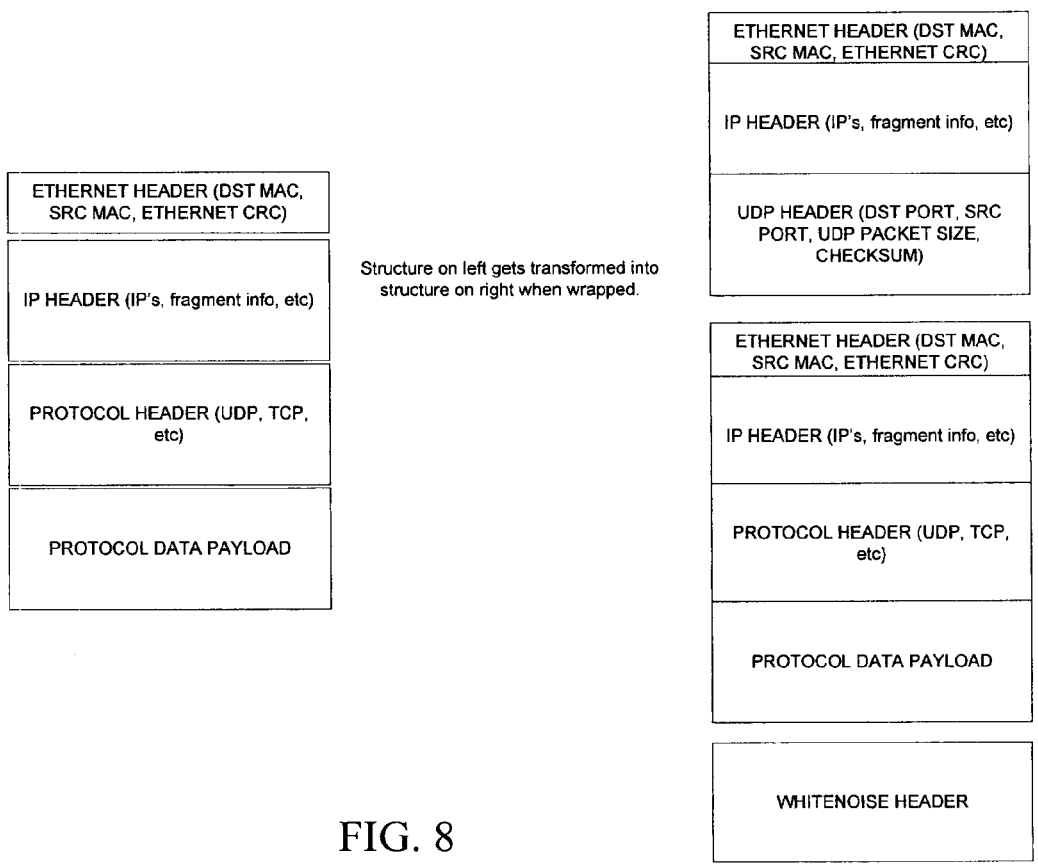
FIG. 8 is a schematic illustration of a packet which is wrapped according to the process.

The actual composition of the encapsulated packet is shown in FIG. 8. Once the packet has been encapsulated into the new packet with the Whitenoise header, the embedded packet can be encrypted with the appropriate session key.

The reasons UDP packets were chosen to encapsulate the encrypted traffic are twofold. UDP is the only common protocol that includes the data size data size in the protocol, thereby allowing additional headers to be appended. Since this is a tunnel protocol, if any re-transmission of data is required, the clients can request it, and it is not needed for the Tunnel to keep track of lost data.

Figure 9:
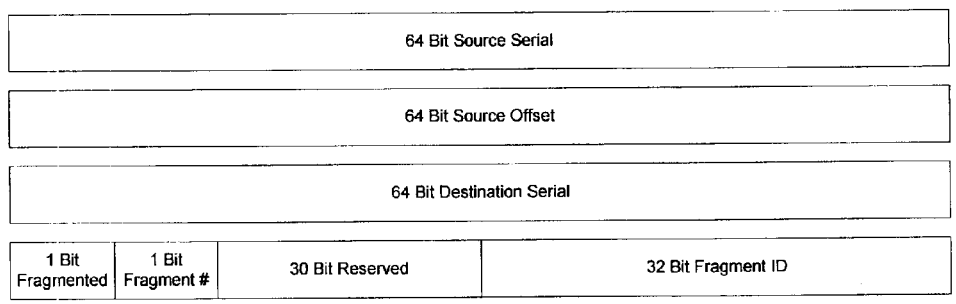
FIG. 9 is a schematic illustration of a header according to the process.

The Whitenoise header, shown in FIG. 9, consists of information to use the encryption, and some information regarding fragmentation for when the tunnel needs to fragment the data packets due to the MTU (Maximum Transfer Unit) being exceeded. The first serial is the serial of the originating system, the second serial is the destination system serial, and the offset is the offset into the Whitenoise cypher stream that was used to encrypt this particular packet. The fragmented bit indicates if this is a fragmented tunnel packet, the 1 bit fragment number indicates if it is the first or second fragment, 30 bits have been reserved for an authentication pad and 32 bits are used for the fragment id used to distinguish these fragments to other fragments. There is a 1 in $2^{32}$ chance that fragments may have overlapping fragment ids and this would corrupt the re-assembly. This header, consisting of 256 Bits, plus the additional Ethernet, IP, and protocol headers, in the encapsulated packet, make up the overhead in the overall tunnel system. This overhead is per packet, so if many small packets are sent out, then the percentage overhead is relatively large, however if large packets from file transfers are used then the overhead is very low.

In the following output from the GateKeeper application, the tunnel packet fragmentation is shown. A packet that is too large to be transmitted after the Whitenoise header is added to the packet, is split into two fragments. Each fragment maintains the original IP header as to make sure the packet gets delivered properly, and has fragmentation information in the Whitenoise header.

```
GateKeeper::init( );
Pipe::init( ); 1
Conveyer:initread( ) ether src not 00:00:00:21:a0:1a and
ether src not 00:04:E2:D7:32:9C
Conveyer::initwrite( )
KeyManager initializing
Conveyer:initread( ) ether src 00:00:00:21:a0:1a
Conveyer::initwrite( )
KeyManager initializing
   incomingconveyer.init( ); 1
   outgoingconveyer.init( ); 1
GateKeeper::run( );
Pipe::run( );
Outgoing: Fragmentation=TRUE copying ip and ethernet
headers
setting new sizes
splitting up packet into fragments
adding 0xA to wnhdr
adding 0x8 to wnhdr
encrypting data sections of the two fragments
fragment checksums
done creating fragments
      display fragment1:
   00 04 e2 d7 32 9d 00 00
   00 21 a0 1a 08 00 45 00
   03 17 ae 40 40 00 40 11
   06 39 c0 a8 01 08 c0 a8
   01 04 26 19 26 19 02 e3
   00 00 00 4d 00 61 00 74
   00 74 00 65 00 72 00 73
   00 2e 00 6d 00 70 00 33
   00 74 00 00 00 00 00 00
   00 00 6a 8e 79 91 cb c5
   01 00 6a 8e 79 91 cb c5
   01 00 da c3 5e 2f d5 c5
   01 00 da c3 5e 2f d5 c5
   01 00 00 00 00 00 00 00
   00 00 00 10 00 00 00 00
   00 10 00 00 00 16 00 00
   00 00 00 00 00 10 00 47
   00 34 00 37 00 4e 00 4f
   00 56 00 7e 00 56 00 00
   00 00 00 00 00 00 00 67
   00 63 00 6f 00 6e 00 66
   00 64 00 2d 00 72 00 6f
   00 6f 00 74 00 7c 00 00
   00 00 00 00 00 80 e2 a0
   94 75 a3 c5 01 80 e2 a0
   94 75 a3 c5 01 80 e2 a0
   94 75 a3 c5 01 80 e2 a0
   94 75 a3 c5 01 00 00 00
   00 00 00 00 00 00 00 10
   00 00 00 00 00 10 00 00
   00 1c 00 00 00 00 00 00
   00 10 00 4b 00 42 00 35
   00 43 00 34 00 31 00 7e
   00 4a 00 00 00 00 00 00
   00 00 00 6b 00 65 00 79
   00 72 00 69 00 6e 00 67
   00 2d 00 77 00 32 00 37
   00 6c 00 6d 00 73 00 00
   00 88 00 00 00 00 00 00
   00 80 cf 21 b1 37 d4 c5
   01 80 79 6f e1 dc d4 c5
   01 80 cf 21 b1 37 d4 c5
   01 80 cf 21 b1 37 d4 c5
   01 d0 34 64 00 00 00 00
   00 00 00 10 00 00 00 00
   00 20 02 00 00 2a 00 00
   00 00 00 00 00 18 00 41
   00 32 00 32 00 43 00 4e
   00 46 00 7e 00 59 00 2e
   00 45 00 58 00 45 00 61
   00 6f 00 65 00 33 00 70
   00 61 00 74 00 63 00 68
   00 2d 00 31 00 30 00 74
   00 6f 00 31 00 30 00 31
   00 2e 00 65 00 78 00 65
   00 60 00 00 00 00 00 00
   00 80 a1 28 42 31 d5 c5
   01 80 e3 5b ef 4a d5 c5
   01 80 a1 28 42 31 d5 c5
   01 80 a1 28 42 31 d5 c5
   01 00 00 00 00 00 00 00
   00 00 00 10 00 00 00 00
   00 10 00 00 00 02 00 00
   00 00 00 00 00 00 00 00
   00 00 00 00 00 00 00 00
   00 00 00 00 00 00 00 00
   00 00 00 00 00 00 00 2e
   00 7c 00 00 00 00 00 00
   00 80 70 5c 5f 2f d5 c5
   01 80 70 5c 5f 2f d5 c5
   01 80 70 5c 5f 2f d5 c5
   01 80 70 5c 5f 2f d5 c5
   01 00 00 00 00 00 00 00
   00 00 00 10 00 00 00 00
   00 10 00 00 00 1c 00 00
   00 00 00 00 00 10 00 4b
   00 31 00 5a 00 36 00 51
   00 39 00 7e 00 31 00 00
   00 00 00 00 00 00 00 6b
   00 65 00 79 00 72 00 69
   00 6e 00 67 00 2d 00 77
   00 57 00 59 00 45 00 73
   00 69 00 00 00 70 00 00
   00 00 00 00 00 00 3d 5a
   24 2f d5 c5 01 00 3d 5a
   24 2f d5 c5 01 80 d3 f2
   24 2f d5 c5 01 80 d3 f2
   24 2f d5 c5 01 00 00 00
   00 00 00 00 00 00 00 10
   00 00 00 00 00 12 00 00
   00 12 00 00 00 00 00 00
   00 10 00 5f 00 39 00 46
   00 54 00 53 00 43 00 7e
   00 4f 00 00 00 00 00 00
   00 00 00 2e 00 58 00 31
   00 31 00 2d 00 75 00 6e
   00 69 00 78 00 01 00 00
   00 00 00 00 00 02 00 00
   00 00 00 00 00 0a 00 00
   00 00 00 00 00 00 00 00
   80 47 81 b5 09        end of display fragment1
sending a second fragment
      display fragment2:
   00 04 e2 d7 32 9d 00 00
   00 21 a0 1a 08 00 45 00
   05 a8 0a a1 40 00 40 11
   a7 47 c0 a8 01 08 c0 a8
   01 04 26 19 26 19 02 e3
   00 00 00 4d 00 61 00 74
```

```
00 74 00 65 00 72 00 73
00 2e 00 6d 00 70 00 33
00 74 00 00 00 00 00 00
00 00 6a 8e 79 91 cb c5
01 00 6a 8e 79 91 cb c5
01 00 da c3 5e 2f d5 c5
01 00 da c3 5e 2f d5 c5
01 00 00 00 00 00 00 00
00 00 00 10 00 00 00 00
00 10 00 00 00 16 00 00
00 00 00 00 00 10 00 47
00 34 00 37 00 4e 00 4f
00 56 00 7e 00 56 00 00
00 00 00 00 00 00 00 67
00 63 00 6f 00 6e 00 66
00 64 00 2d 00 72 00 6f
00 6f 00 74 00 7c 00 00
00 00 00 00 00 80 e2 a0
94 75 a3 c5 01 80 e2 a0
94 75 a3 c5 01 80 e2 a0
94 75 a3 c5 01 80 e2 a0
94 75 a3 c5 01 00 00 00
00 00 00 00 00 00 00 10
00 00 00 00 00 10 00 00
00 1c 00 00 00 00 00 00
00 10 00 4b 00 42 00 35
00 43 00 34 00 31 00 7e
00 4a 00 00 00 00 00 00
00 00 00 6b 00 65 00 79
00 72 00 69 00 6e 00 67
00 2d 00 77 00 32 00 37
00 6c 00 6d 00 73 00 00
00 88 00 00 00 00 00 00
00 80 cf 21 b1 37 d4 c5
01 80 79 6f e1 dc d4 c5
01 80 cf 21 b1 37 d4 c5
01 80 cf 21 b1 37 d4 c5
01 d0 34 64 00 00 00 00
00 00 00 10 00 00 00 00
00 20 02 00 00 2a 00 00
00 00 00 00 00 18 00 41
00 32 00 32 00 43 00 4e
00 46 00 7e 00 59 00 2e
00 45 00 58 00 45 00 61
00 6f 00 65 00 33 00 70
00 61 00 74 00 63 00 68
00 2d 00 31 00 30 00 74
00 6f 00 31 00 30 00 31
00 2e 00 65 00 78 00 65
00 60 00 00 00 00 00 00
00 80 a1 28 42 31 d5 c5
01 80 e3 5b ef 4a d5 c5
01 80 a1 28 42 31 d5 c5
01 80 a1 28 42 31 d5 c5
01 00 00 00 00 00 00 00
00 00 00 10 00 00 00 00
00 10 00 00 00 02 00 00
00 00 00 00 00 00 00 00
00 00 00 00 00 00 00 00
00 00 00 00 00 00 00 00
00 00 00 00 00 00 00 2e
00 7c 00 00 00 00 00 00
00 80 70 5c 5f 2f d5 c5
01 80 70 5c 5f 2f d5 c5
01 80 70 5c 5f 2f d5 c5
01 80 70 5c 5f 2f d5 c5
01 00 00 00 00 00 00 00
00 00 00 10 00 00 00 00
00 10 00 00 00 1c 00 00
00 00 00 00 00 10 00 4b
00 31 00 5a 00 36 00 51
00 39 00 7e 00 31 00 00
00 00 00 00 00 00 00 6b
00 65 00 79 00 72 00 69
00 6e 00 67 00 2d 00 77
00 57 00 59 00 45 00 73
00 69 00 00 00 70 00 00
00 00 00 00 00 00 3d 5a
24 2f d5 c5 01 00 3d 5a
24 2f d5 c5 01 80 d3 f2
24 2f d5 c5 01 80 d3 f2
24 2f d5 c5 01 00 00 00
00 00 00 00 00 00 00 10
00 00 00 00 00 12 00 00
00 12 00 00 00 00 00 00
00 10 00 5f 00 39 00 46
00 54 00 53 00 43 00 7e
00 4f 00 00 00 00 00 00
00 00 00 2e 00 58 00 31
00 31 00 2d 00 75 00 6e
00 69 00 78 00 01 00 00
00 00 00 00 00 02 00 00
00 00 00 00 00 0a 00 00
00 00 00 00 00 00 00 00
a0 47 81 b5 09        end of display fragment2
```

This above fragmentation is not completed, as even though the packets are re-assembling properly, there are still cases of fragmentation not being handled properly resulting in corrupted packets being produced. This corruption is not critical in system operation however, as the client's simply have to set their MTU to 1300 in order to accommodate packets which would never need to be fragmented.

In the following output from the GateKeeper Application, the key retrieval process is shown.

```
GateKeeper::init( );
Pipe::init( ); 1
Conveyer:initread( ) ether src not 00:00:00:21:a0:1a and
 ether src not 00:04:E2:D7:32:9C
Conveyer::initwrite( )
KeyManager initializing
Conveyer::initread( ) ether src 00:00:00:21:a0:1a
Conveyer::initwrite( )
KeyManager initializing
   incomingconveyer.init( ); 1
   outgoingconveyer.init( ); 1
GateKeeper::run( );
Pipe::run( );
Incoming: Detecting header
  HeaderFound!
Detecting fragmentation
wnhdr[24]: 112233
failed to open file for reading 0x409fd238retrieve key
from fault
creating request: 1:2
checking response to 12
sizeof unsigned long long: 8
key was found on fault responsesize: 50
key found had UID: 69
key found had offset: 10
key found had scpcrc: 10
key found had length: 18
copying key
done copying key
key on vault
save key to drive path:
/tmp/Keys/0000000000000001/0000000000000002.key
```

As can be seen, the GateKeeper receives a packet, realizes it does not have the key in the local memory, or hard disk cache, and so it requests it from the KeyVault and saves it to the local cache.

In the screen output below, the rule system is illustrated. The protocol of the incoming packet is displayed (as its numeric code) and the rule as to ACCEPT/DROP/ENCRYPT is shown as well:

```
GateKeeper::init( );
Pipe::init( ); 1
```

-continued

Conveyer:initread( ) ether src not 00:00:00:21:a0:1a and ether src not 00:04:E2:D7:32:9C
Conveyer::initwrite( )
KeyManager initializing
Conveyer:initread( ) ether src 00:00:00:21:a0:1a
Conveyer::initwrite( )
KeyManager initializing
   incomingconveyer.init( ); 1
   outgoingconveyer.init( ); 1
GateKeeper::run( );
Pipe::run( );
$ <LPP>PMIHPDS</LPP>
================
Incoming:6 ACCEPT ← here is an incoming 6/TCP packet market to ACCEPT
$ <LPP>PMIHPDS</LPP>
+++++++++++++++++14:0:20
00 0e a6 14 1e 8e 00 00
00 21 a0 1a 08 00 45 00
00 34 df a8 40 00 40 06
d7 5e c0 a8 01 08 c0 a8
01 64 80 2a 00 8b ab 6f
9e b7 55 2a bb 33 80 10
05 b4 6a be 00 00 01 01
08 0a 00 04 7d f7 00 15
29 43
================
  OutgoingData ACCEPT ←here is an outgoing packet market as ACCEPT
$ <LPP>PMIHPDS</LPP>
+++++++++++++++++0:0:20
ff ff ff ff ff ff 00 00 ←here this packet is a broadcast packet so possibly could be filtered.
00 21 a0 1a 08 06 00 01
08 00 06 04 00 01 00 00
00 21 a0 1a c0 a8 01 08
00 00 00 00 00 00 c0 a8
01 04 00 00 00 00 00 00
00 00 00 00 00 00 00 00
00 00 00 00
================ The packet below has been marked as ACCEPT_ENCRYPT
OutgoingData ACCEPT_ENCRYPT <LPP>PMIHPDS</LPP>
Fragmentation=FALSE CopyIP&EHeader: ChangeProtocol ChangeSizeInIPHeader CreateUDPHeader CreateTunnelHeader
getserial( )19216818
c0a80108
getSerial: c0a80108
getserial( )19216814
c0a80104
getSerial: c0a80104
Getting key: 2:1 ←Here the key has to be retrieved from the KeyVault
failed to open file for reading 0x41400a08retrieve key from fault
creating request: 2:1
$ <LPP>PMIHPDS</LPP>
+++++++++++++++++0:0:20
00 04 e2 d7 32 9c 00 0e
a6 14 1e 8e 08 06 00 01
08 00 06 04 00 02 00 0e
a6 14 1e 8e c0 a8 01 64
00 04 e2 d7 32 9c c0 a8
01 65 00 00 00 00 00 00
00 00 00 00 00 00 00 00
00 00 00 00
================
Incoming:11 ACCEPT
checking response to 12
sizeof unsigned long long: 8
key was found on fault responsesize: 58
key found had UID: 23
key found had offset: 10
key found had scpcrc: 7318349394477056
key found had length: 825229312
copying key The foregoing debugging output statements are disabled by default, but are still in the code for developers to view. These output statements are suppressed in the final system is for performance reasons.

Putting the Whitenoise tunnel header immediately after the data section of the actual packet, and encrypting the whole data section, leaving the header intact for traveling would not work since the TCP protocol has no field in its protocol header to indicate the length of the data payload. This means there is no way of detecting whether or not another header is present at the end of a packet, or whether the application on the other end could ignore the appended header. Instead the present system encapsulates the whole packet (regardless of protocol) into a new custom UDP packet, since the UDP protocol does indeed have a field that specifies how much data the payload carries, thus allowing detectable appended headers. Just using "conveyor" threads that read, process and write all at once reduces the ping times to unnoticeable (0 ms to 1 ms which are typical on a LAN). The threading model drops CPU usage to 5-7%. Also to avoid all network traffic going through the tunnel, a Berkeley Net Filter is applied on the reading of the packets that filters out the MAC address of the client system on the external network card.

With respect to the KeyVault, to avoid problems from the difference in data types sizes from different processors (e.g. a 64 Bit AMD CPU to a 32 Bit Intel CPU. In C declaring an unsigned long on a 64 Bit machine creates a 64 bit number; on the 32 bit machine the same data type declaration is compiled to a 32 bit value. This causes some issues when the two machines try to communicate.) Unsigned long longs are declared instead; this forces 64 bit data types regardless of platform.

Installation Process

A prototype system was installed for a Linux machine using Fedora Core 4 with the full install option. Many Linux configurations by default do not allow a regular user access directly to the datalink layer for security reasons. These applications need to be run as either root or pseudo.

Requirements for a prototype system are as follows:
Minimum of 5 computers
  1 computer to serve as the KeyVault (with Linux)
  2 computers to serve as the GateKeepers (64-Bit AMD Arch. was used in testing)
    Configured with Linux (Fedora Core 4 used in test setup)
    Libnet libraries installed (libnet.tar.gz)
    Libpcap libraries installed (libpcap-0.9.3.tar.gz)
    QT libraries installed (included in submission as qt-x11-opensource-desktop-4.0.0.tar.gz)'
    2 network cards
  2 computers to transparently use the Tunnels
    These systems may be configured with any operating system and use any applications.
    Configured to work on a local area network
    Network MTU set to 1300 Bytes in Test Setup
      Use DRTCP021.exe to set the MTU on a windows machine or do man ifconfig in linux to set the MTU
Linux machines do not need to reboot after using ifconfig to set the MTU.

After having installed all the necessary libraries and compilers on the GateKeeper machines, the included "compile" file is set to executable (chmod+x./compile) and execute the compile script. This will compile the included source code and inform one of any missing packages the system requires.

After having installed all the necessary compilers on the KeyVault machine and set up a "/tmp/Keys" folder, one sets the "compile" file to executable (chmod+x./compile) and executes the compile script to compile the KeyVault for the platform it is being run on. This script will also tell one of anything else that needs to be installed.

Configuration Process

All configuration of the GateKeeper system needs to be done in the "Include.h" file in the GateKeeper source folder. The section:

```
// the ip of the keyvault server
#define KEY_VAULT_IP      "192.168.1.100" // put the
server IP here!
#define KEY_VAULT_PORT    1357 // put the port you
configured the KV as here! (and make sure your firewall
allows outgoing and incoming UDP packets on this port
```

Needs to be modified to reflect the IP address and port being used by the KeyVault Server.

The sections:

```
// GK2
//#define INCOMINGFILTER "ether src not 00:04:e2:d7:32:9-
d"
//#define OUTGOINGFILTER "ether src 00:04:e2:d7:32:9d"
//#define MAC 0x0004e2d7329d
//#define INTERNAL_SYSTEM_IP    "192.168.1.4"
//#define EXTERNAL_SYSTEM_IP    "192.168.1.8"
//#define OUR_KEY_SERIAL 2
//#define OTHER_KEY_SERIAL  1
// GK1
#define INCOMINGFILTER "ether src not 00:00:00:21:a0:1a
and ether src not 00:04:E2:D7:32:9C"
#define OUTGOINGFILTER "ether src 00:00:00:21:a0:1a"
#define MAC       0x00000021a01a
#define INTERNAL_SYSTEM_IP      "192.168.1.8"
#define INTERNAL_SYSTEM_IP_A    {192, 168, 1, 8}
#define EXTERNAL_SYSTEM_IP      "192.168.1.4"
#define EXTERNAL_SYSTEM_IP_A    {192, 168, 1, 4}
#define OUR_KEY_SERIAL          1
#define OTHER_KEY_SERIAL 2
#define EXTERNALDEVICE "eth0"
#define INTERNALDEVICE "eth1"
```

This needs to be modified to reflect the actual MAC addresses and IPs of the two systems that will be using the GateKeepers and not the GateKeepers themselves. The MAC of the actual GateKeeper does however need to be included in the Berkeley Packet Filter syntax found as the second MAC address in the INCOMINGFILTER definition.

In the above header file, the comment "GK1" refers to one of the clients, and "GK2" refers to the other client. One either comments out the whole "GK1" section or the whole "GK2" section.

On each GateKeeper, depending which network cable one plugs into which network card, one sets the appropriate EXTERNALDEVICE and INTERNALDEVICE. EXTERNALDEVICE is the network card that has a cable that leads to the switch/router. INTERNALDEVICE is the network card that has a cable that leads to the computer that wishes to use the tunnel.

Other options include modifying the port number for the tunnel (9753 by default, must be open on both GateKeepers' firewalls) are also in that header file, but it is not necessary to alter anything else for operation.

Implementation Implications

There are some implications in implementing a secure tunneling system combined with the KeyVault system. Not only does the system create a secure point-to-point communications layer, but it also provides a way for dynamically adding new GateKeepers to the system without having to copy the key manually to every other client before communication can commence. At the same time it is satisfying the authentication requirement. The problem with SSH (an alternative secure tunnel system) for example, is that it is vulnerable to man-in-the-middle attacks. Distributed keys, by their very nature destroy the possibility of a MITM attack; since, an unencrypted key exchange never occurs, there is never a chance for a hacker to intercept or spoof the keys.

The Whitenoise stream cipher is particularly useful in the present invention for several reasons. It is cryptographically strong. It is a robust bit-independent encryption. The Whitenoise stream cipher provides a unique property that most other cryptography methods do not share, that is, once the data is encrypted, the bits are completely independent of one another. This is very useful when dealing with communications because often single bits will get corrupted when transferring large amount of information, and sometimes it is impossible to re-send the information, and so when the cryptography method used fails because of one bit being corrupted, then the data is lost or a huge performance hit is reached due to the necessity to resend the data. Whitenoise overcomes this issue by being bit independent. If a bit gets corrupted while being encrypted in Whitenoise, the resulting decrypted data is exactly how it would be if it were not encrypted in the first place.

The Whitenoise predistributed and pre-authenticated private key is used as AES session key generator thereby eliminating PKI based Trusted Third Parties for session key generation and eliminating this part of server overhead by moving it effectively to the client. Because of its highly random nature and extraordinarily long streams, Whitenoise is ideal for this purpose. Other Random Number Generators (RNGs) can be deployed, albeit less efficiently. Key generation can also occur at the server but increases unnecessarily the server overhead.

For Key Generation, the distributed keys (not session keys) are preferably all manufactured using the serial number, MAC#, NAM, or other unique identifiers as a seed in the key generation to manufacture a user/device specific key. This authenticates a device. Only the single device has the correct Universal Identifier to be able to decrypt the device/person specific distributed key with the application key (a secret key associated with the application which is never transmitted and is protected and machine-compiled within the application). This helps avoid piracy and spoofing. Thus to distribute the keys, the server will first send a serial number read utility to a new appliance as a firmware patch. The new appliance sends the MAC#, NAM or UID to the server. The server then generates unique keys and unique starting offsets from the serial number, updates itself with the UID, offset and key information, encrypts the private key with the application key and sends a package with encrypted private key(s) and secure application to the new device.

The following are various additional features of the system. Packet Authentication Pad may be added to the custom Whitenoise header. This may be used to protect against the possibility that small predictable rejection responses of a server may be blocked and intercepted by a hacker in order to reverse engineer small portions of the Whitenoise Stream. This authentication pad consists of another segment of the Whitenoise Stream interacting with Whitenoise Labs' CRC checker (which eliminates the possibility of a 100% predictable packet).

IP Fragmentation Completion may be provided. Currently the GateKeeper Tunnel Packet Fragmentation causes approximately a 1% corruption of fragmented packets. This should be corrected in the system if 100% transparency is to be maintained. This fragmentation is necessary for maintaining packets under the maximum transmission size for Ethernet of 1500 bytes. As noted above in the configuration section, MTU should be set to 1300 bytes in order to make sure that fragmentation by the tunnel never occurs.

The MAC address and IP addresses inside the tunnel may be replaced by the tunnel packet's MAC and IP in the unwrapped packet. This is necessary to ensure compatibility with subnets across the Internet, so the system will work beyond just a LAN or on an exposed Internet connection with no network address translation. A MAC to IP address binding can be added as a failsafe to double-check the authenticity and watch for attack attempts.

Implementing a KeyVault protocol to handle Key Fragmentation will allow the system to handle maximum key sizes of greater than $2^{16}$. GateKeeper registration and update management can also be incorporated. This can also be used to add IP addresses dynamically to the list of secure systems so that rules need not be created manually. A logging facility that watches for attack attempts or offset synchronization issues can be added for system administrators to identify malicious activity.

Offset Overlap Checking can be added to see if an offset is being used twice. One can compare the actual data represented by the offsets or the offsets themselves. A pad should never be used more than once, otherwise it is subject to statistical analysis attacks.

Some systems in the near future that may benefit from the DKI architecture, besides the tunnel, may include email servers/clients, and cell phones to establish secure calls in the field. Since the system relies on Berkeley packet filter type expressions to determine the types of packets read, this system can be easily integrated with firewall features.

Disabling non-encrypted traffic is an option in the GateKeeper system; however this is not practical for most environments since people need to send email outside of the company and surf the web. In some situations, as in hospitals and military, and corporate research facilities, the need for security may be great enough that the GateKeeper would drop all non-encrypted traffic.

Figure 10:
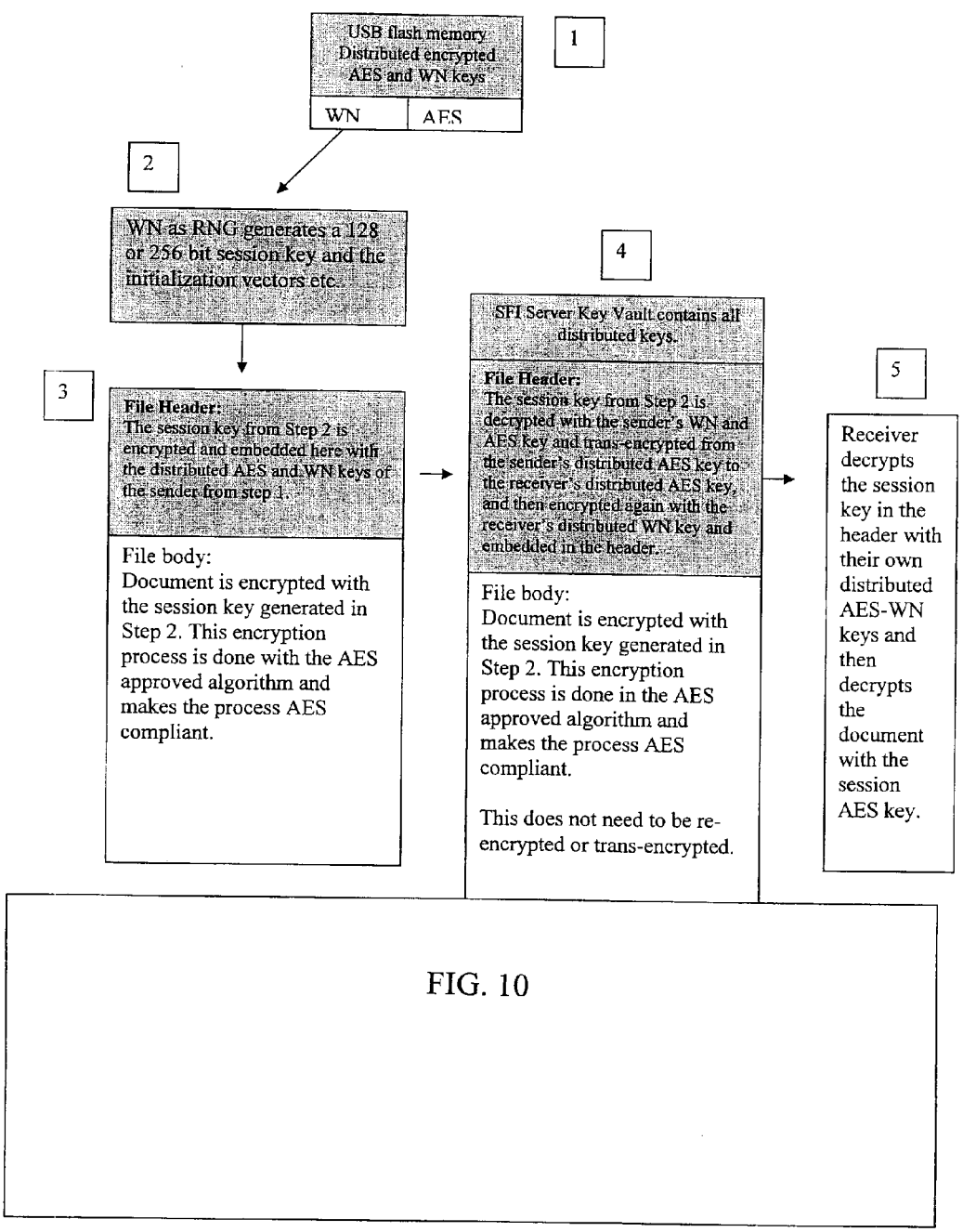
FIG. 10 is a flowchart illustrating a hybrid AES-Whitenoise process.

FIG. 10 illustrates the method where the Whitenoise pre-distributed and pre-authenticated private key is used as AES session key generator, thereby eliminating PKI-based Trusted Third Parties for session key generation and eliminating this part of server overhead by moving it effectively to the client. Because of its highly random nature and extraordinarily long streams, Whitenoise is useful for this purpose. Other Random Number Generators can also be used. Key generation can also occur at the server but increases unnecessarily the server overhead.

First the System administrator distributes a unique private Identity Management AES-WN (Whitenoise) key pair on a USB flash memory stick (or other media) to an employee. Alternatively, at manufacturing, devices can have a unique private key associated with a unique device identifier burned into the device during the manufacturing process.

The user is authenticated by two factors: possession of the distributed key and a robust .NET password. The two factors are something they have and something they know. The user (sender) begins by putting his distributed private AES-WN key pair in the USB drive. [In this case the distributed keys are on flash memory, smart cards etc.] He then enters his password and he is authenticated. This process has eliminated the need for a third party authentication.

To send a secure file, the Whitenoise ("WN") distributed key acts as a random number generator and produces either a 16-byte (128-bit) or 32-byte (256-bit) session key and initialization vectors. Session keys can be any size. This session key generation is done at/by the client and this eliminates any outside Trusted Third Party for session keys. Session key generation can also be done at the server but increases overhead with the generation and secure transmission back to the client. This session key then encrypts the file using a standardized AES encryption algorithmic technique. The encryption process in this manner makes the system AES compliant.

As noted above, the distributed key may be generated specifically for a specific client by using a Universal Identifier like a MAC, serial number, or NAM of the client as a seed to make those distributed keys user/device specific and preventing piracy and spoofing. To enhance key security, when the application is initiated the application key uses the unique serial number on the device to decrypt the Private key. The application will be able to decrypt and use the private key if the serial number is correct. A pirated or copied key will be copied to another medium without the unique serial number and so the application key will be unable to decrypt the pirated private key. Files encrypted with that key cannot then be opened or used by the pirate. If a key is reported as stolen it can be immediately deactivated.

After having encrypted the file, the session key itself is encrypted (along with initialization vectors etc.) by the sender's pre-distributed AES key contained on the AES-WN distributed flash memory private keys. The AES encrypted—AES session key is then encrypted again with the WN distributed authentication key and embedded in the header of the encrypted file. WN encapsulating the AES encrypted-AES session key acts as the Identity Management authenticator and strengths the protection of the session key by adding this strong authentication. A pre-distributed pre-authenticated AES key can also do the second layer of authentication encryption.

This file is sent to the receiver via the SFI server/key vault that contains a duplicate copy of all AES-WN distributed key pairs. At the server, the server's copy of the sender's WN private key decrypts the encrypted header session key, removing the encapsulating layer of WN authentication encryption. The server trans-encrypts the session key from being encrypted in the Sender's AES key to the Receiver's AES key. This trans-encrypted session key is then encrypted with the receiver's distributed WN key, again encapsulating the encrypted session key and being the authentication layer. It is embedded in the header. The file is sent to the receiver.

The receiver is authenticated by having the matching distributed WN key and by knowing the password to activate it. The receiver is then able to decrypt the encapsulating authenticating layer. This leaves the AES encrypted-AES session key. This is decrypted with the receiver's distributed AES private key. The authenticated and decrypted session key is then used to decrypt the document or file.

The Authentication Server and Key Vault for the Dynamic Distributed Key Identity Management and data protection system as shown in FIG. 10 has a copy of all physically distributed keys and key pairs for each person/device on the system. The key pairs can be WN-WN, WN-AES, or AES-AES or any other encryption key pairs. The server may have session key generation capacity for creating new key pairs for physical distribution or for encrypted distribution in a dynamic distributed key environment; or, pre-manufactured key pairs can manually be inserted for availability by the authentication and key vault server for additional security and lower processing effort by the server. In a dynamic distributed key environment, new keys are encrypted and delivered to new nodes encrypted in keys that have already been distributed. This eliminates session key distribution using asymmetric handshaking techniques like Diffie-Hellman. Additionally, this model eliminates the need for Trusted Third Parties (outside sources) for the creation and issuance of session keys. Session key generation, when required, is preferably done by the client thereby eliminating this function as a source of increased server overhead. Session key generation may also be done by the server, or outside the server by a systems administrator.

AES session key generation is ideally done at the client preferably using a Whitenoise pre-distributed, pre-authenticated key as a robust, fast, low overhead random number generator to generate AES keys. Other random numbers generators and math libraries may be used. Dynamic distributed key architectures authenticate pre-qualified users based on something they have (pre-distributed private keys on devices, flash memory etc.) and something they know (robust password following Microsoft's ".Net2" standards for robust and secure passwords). This eliminates the dependency on third party Certificate Authorities currently required to establish identity electronically.

In dynamic distributed key architectures, the server can use its ability to trans-encrypt the secure traffic through the server from being encrypted in the key of the sender into being encrypted in the key of the receiver. Because of the speed of Whitenoise, it is possible to transcript the entire transmission (file, session keys and vectors) without negative impact on performance. A preferred alternative, to further minimize the computational overhead at the server when using either AES key pairs alone (particularly), or AES-WN key pairs, or WN-WN key pairs, is to simply trans-encrypt the double encrypted session key itself.

The trans-encryption process for session keys is as follows. An AES session key is created (preferably at the client). This session key is used to encrypt a file utilizing a standard AES algorithm. This created session key is encrypted with the client's pre-distributed AES private key. This AES encrypted session key is then double encrypted with the pre-distributed AES or WN authentication key (the other key in the distributed key pair) effectively encapsulating and double encrypting the session key and increasing by orders of magnitude the effective security and bit strength of the protection. At the server, the trans-encryption process authenticates the sender by being able to decrypt the authentication layer with a copy of the sender's distributed authentication key, then decrypting the AES session key with a copy of the sender's distributed AES key, then re-encrypting the session key with a copy of the receiver's predistributed AES private key, and finally encrypting all of the above with a copy of the receiver's predistributed authentication key. The double encrypted session key is then embedded in the header of the file and the file is forwarded to the recipient.

While this is a four-step trans-encryption process, server processing is minimal because only the AES (or WN) session key is trans-encrypted. For example: a 128-bit AES session key is 16 characters or bytes long. The entire trans-encryption process is only manipulating a total of (16 bytes×4 steps) 64 bytes. This is negligible even for strong AES keys. It ensures robust security by strong protection of the session key (never transmitted unencrypted electronically) with minimal server processing.

This process improves Identity Management and data protection in contexts where governments or enterprises are encumbered by having to use existing AES standards even though these standards have proven to be ineffective and of questionable security. It allows immediate compliance with existing standards while facilitating the gradual transition to stronger encryption and authentication algorithms and techniques.

Double Private Key System

A two token system or double private key system can also be used. Each endpoint creates their own Private Key by an adequate method (RNG, robust pass-phrases, use of sub key schedule etc.). There is no key transmission, just initial starting key history (token). Client and endpoints all create their own keys. This provides reduced storage, as there is just previous the history (token), offset and key structure. To initiate the process the use of a secure channel, like SSL, is required. This prevents Man-in-the-Middle. First computer A XORs their first token (starting from a random offset only they know) with the shared secret and sends to B. B XORs their first token (starting from a random offset only they know) with the shared secret and sends to A. Each end point has authenticated the other. Each endpoint has a starting key history of the other. Each endpoint has generated their own initial offset that no other party knows (an additional secret). Each endpoint has generated their own private key (their secret) and they have never shared it or transmitted it. A creates a token using their own token history sender THs [generated from their own private key and secret offset] and XORs with the token history of the receiver THr [the actual chunk of data received at last session]. Each endpoint has the last token history (the actual chunk of history data) of the other endpoint that was transmitted the previous session; each endpoint has their own offset and secret private key that has never been transmitted.

| Sender s | Receiver r |
| --- | --- |
| Ps = Private key of the sender | Pr = Private key of the receiver |
| THs = token history sender | THr = token history of the receiver |

The token history of the sender THs is always generated from their secret offset and private key. The token history of the receiver THr is always the actual data block (token) received from the Sender in the previous session.

Sender: THr XOR THs=this session token
Receiver: decodes using THr that he generates.
   Receiver has authenticated sender.
   Receiver uses and then retains THs for next time
   And vice versa if desired (doubling)

There is thus a dynamic between offset and actual token history (data block). One authenticates without the private keys ever being transmitted back and forth. Each endpoint does not need to store their own token history (actually preferable not to) because they can regenerate the last token history for their private key and current offset by going backwards on the key one session volume (length of a session TH component). If someone captures a token history (actual data block) they can determine the senders private key or offset. If someone captures an offset, they can determine the token history (data block because they don have the private key.

Ongoing Identity Authentication Component

The present system manages the identity of users by 1) initially ensuring that the individual accessing the system is who they say they are, by referencing the last point in the key reached during the last session with the same user. The system stores the point in the Whitenoise stream cypher where the previous session for that user stopped and compares the starting point of the stream cypher at the start of the next session for that user; 2) verifying the user's identity throughout the session; 3) ensuring that a duplicate key is not in existence; and 4) defending the network if an intruder is detected by denying access to both users. The reported loss or theft of a key results in instantaneous denial of access.

The process provides meaningful and highly differentiated authentication and detection features. The critical insight here is that as content is being consumed, so is the WNkey being consumed. An aspect of the interaction between two endpoints is therefore the index into the WNkey. This value is not likely to be known by third parties. Even if the WNkey was stolen, or were the corresponding key structure compromised along with knowledge of the WNL algorithm, ongoing use of the WNkey to gain unauthorized access to protected data would not be possible without the index value corresponding to the authorized history of use between legitimate correspondents. This continuous authentication and detection feature is called Dynamic Identity Verification and Authentication [DIVA]. The DIVA sings only for the correct audience. Not only will illegitimate users of the WNkey be denied, but the legitimate users will immediately and automatically benefit from knowledge of the attack and attempted unauthorized use: the WNkey does not need to be explicitly revoked; it will simply become unusable to its legitimate owner. This can also be accomplished using other non-Whitenoise algorithms that produce long deterministic random (or pseudorandom) data streams or by invoking iterations or serialization of those outputs.

In the process of ongoing real-time continuous authentication, referred to as Dynamic Identity Verification and Authentication, an unused portion of the key stream is used in a non-cryptographic sense. A chunk of random data from the key (or Random Number Generator) and its offset are periodically sent during the session to the server and compared against the same string generated at the server to make sure they are identical and in sync. This random chunk (unused for encryption) can be held in memory and compared immediately, or written back to media like a USB or a card with write-back capacity for comparison in the future. This segment has never been used and is random so there is no way for a hacker to guess or anticipate this portion of the stream. The unused section of keys stream that is used simply for comparison between server and the client can be contiguous (next section of the key used after encryption), random location jumping forward, or a sample of data drawn according to a function applied to the unused portion of key stream. Whitenoise is deterministic which means that although it is the most random data source identified, two endpoints can regenerate the identical random stream if they have the same key structure and offsets.

There is currently no standard or effective protocol for the enumeration and ongoing presence detection of external USB devices and components from a server through a client's computer to determine its presence for authentication of physically based removable keys like USB flash drives, memory cards and sticks, smart cards etc. Reliable presence determination is critical to prevent spoofing and other security breaching techniques. It is important to be able to check identifiers like MAC numbers and serial numbers (as well as any other unique identifiers) for both initial and ongoing authentication of the client. This is one factor in multi-factor authentication (something you have and something you know).

An example of a preferred ongoing USB device/appliance authentication technique is offset overlap checking. In this context it is the offsets being compared to one another. Example:

Client Side:
1) offset is set to 100
2) encrypt data A of size 200, and increment offset by 200
3) send the data
4) offset is now set to 300
5) encrypt data B of size 300, and increment offset by 300
6) offset is now set to 600
Server Side:
1) because of network congestion data B arrives before data A
2) server recognizes that the offset is way ahead, but that is acceptable, because this stream has never been used.
3) data A arrives, server recognizes there may be an issue because the offset used is lower than the highest offset used so far
4) server checks for overlap: 100+200=300, 300+300=600, no overlap!

An example where overlap does indeed occur, is where data A is encrypted at offset 100 with a size of 100, then data B is encrypted at offset 150 with a size of 100. 100 to 200 overlaps with 150 to 250 from the offset 150 to 200 (50 bytes overlap) would signal that someone is attempting to tamper with the system.

Modified or alternative USB presence techniques that can be effectively used include sending bits of key stream up to the server to authenticate and make sure that the offsets are in sync and identical with the bits and offsets of the identical key pairs of the client at the server. MAC Numbers, serial numbers and other unique identifiers can be used as well. It can be programmed to occur whenever an action takes place. Offsets can be incremented to reflect and bypass the bits used for ongoing session authentication so that these bits of keys stream are never repeated and used.

A similar process can be used with credit cards. The difference is that one is actually transferring a random segment of data and both the server and the client (smart card) are actually updated with a 1 kilobyte segment of data. After a successful comparison of the same chunks of data, the process sets up for the next transaction or continuous authentication by copying back a fresh segment of data from the next unused segment of the key stream. The difference is like opposite sides of a coin—one side just checks the offsets that are saved, and the other side actually checks the data represented by those offsets e.g. offset 1222285 plus the next 1 k. Then one increments by 1 to set the next offset for the next segment of random data used for verification. This can be called as often as desired.

A database has the users' demographic information, such as the account number, an offset value and a key reference that points to WhiteNoise. For example, a user is making a purchase with his smart card. A smart card has a unique account number which is also stored in the database. On this account, there are several credit cards, for example, Visa, Master and American Express. For each credit card on the smart card, there is a 1 k segment of random data corresponding to it.

The transaction is carried out as follows. The smart card is swiped in step 1. The user is asked to enter his password in step 2. If the password is valid, the smart card number pulls up the user's entire information in the database in step 3. The information includes demographic information, an offset value and a key reference. At the same time, 1 k segment of data is uploaded from the smart card to some place on the server. After being pulled up from database, the offset value and the key reference are loaded to WhiteNoise in order to generate 1024 bytes random data. (step 5). Once the 1 k random data are generated, they are stored on the server. (step 6) Then the 1 k data generated by WhiteNoise in step 6 and the 1 k data uploaded from smart card in step 3 are compared. (step 7) If they are matched, then a transaction starts. Otherwise, the transaction is denied. (step 8) After the transaction is done, the offset value is incremented up 1024 bytes. The database is updated with the new offset value. Also, the balance on the credit card needs to be updated. (step 10) At the same time, the new offset value and key file are sent back to the WhiteNoise to generate new segments of random data. Starting at the position pointed to by the new offset, a new 1024 bytes random data are picked. (step 11) The new 1 k chunk of data is then sent back to USB chip and overwrites the old 1 k chunk of data. (step 12) It is now ready for the next transaction.

A dynamic distributed key system preferably uses a robust password (something they know). It is not uncommon for users to forget or lose their passwords and their retrieval is necessary for the ongoing use of this Identity Management paradigm so that users can continue to be authenticated and able to retrieve encrypted information or files. There are two primary techniques for password recovery while maintaining anonymity of the users. 1) At time of system initiation and use, a user registers their key without personal demographics but rather by the use of several generic questions and answers that are secret to the user. The server can then re-authenticate and securely re-distribute this password in the future if necessary. 2) The user accesses secure applications and services with a unique distributed key, an application key and a generic password. The users change their passwords. Their new password is then encrypted with the application/private key and stored safely on a user's device/computer or removable device. In the event a password is forgotten, the encrypted password can be sent to the server and the user is re-authenticated, and the server can re-issue another default password for that user associated with their physically distributed private key. This would be sent in an encrypted state to the user.

A Perturbing Method of Key Creation

Key creation, storage and distribution are always important considerations in creating secure systems that protect data and manage identities. Whitenoise keys are multifunctional. One aspect of them is that they are very efficient deterministic stream random number generators. With just the knowledge of the internal key structure, and offsets, two end points can recreate the identical stream segment (token). In a distributed key system, each end point has pre-distributed key(s). Without transmitting key information, and just transmitting offsets, each end point can recreate the identical key segment (token) that has never yet been created or transmitted. As such, these authenticating key segments cannot be guessed or broken by interlopers. Capturing authenticating tokens are not a sufficient crib to be able to break the actual key of which they are simply a tiny bit-independent segment.

Whitenoise keys are the preferred method to accomplish this because key storage space, computational overhead, and the size of footprint on both the server and client devices are minimized. A small amount of internal key information and offset generates enormous highly random key streams and minimizes storage requirements for long keys for each person or device on the network. Key distribution happens in one of several of ways:

The key(s) are physically given to the client/server

The distributed keys are manufactured (burned or branded) onto a device using a device Universal Identifying number like a MAC #, serial number, NAM (cell phones) to associate a key to a specific device to combat piracy of the key A distributed key is associated with a specific device and electronically returned to the device or person encrypted in an application key for readily scalable secure networks or identity management schemes.

A generic application key schedule that all endpoints have is "perturbed" to create a unique user/device specific key by the secure exchange of a session key that is used with an algorithmic key schedule to create a unique deterministic key for use by the endpoints. This abstraction technique means that the key used by the endpoints is never transmitted. An algorithmic key schedule is a series of sub-key structures populated with random bits.

An example of a perturbing method of key generation is as follows:

Key Generation Technique

The Key K is the session key transmitted by a secure method. The Sub-Keys $SK_1 \ldots SK_n$ are an algorithmic key schedule that has been pre-distributed to the endpoints. Each endpoint and the server have an identical algorithmic key schedule that is comprised of n sub-keys of various lengths populated with randomized bits. Key schedules can be modified from application-to-application. A virtually endless array of different key schedules may be used to add higher levels of variability between different applications. The server sends endpoint A the session key K by a secure process (SSL, Diffie-Helman etc.). Offsets are independent of key creation. For encryption use, the offset is managed by the application to prevent re-use of key segments. For identity management, detection and the use of DIVA, the offset is determined by process or formula from the distributed key K values. For example, break a 128-bit (16 byte) key K into 8 2-byte segments and XOR these segments to create a compressed/reduced offset value.

i) Starting at the offset P, XOR the corresponding bits of the session key K and Sub-Key 1 ($SK_1$) until the sub-key is completely processed ii) After $SK_1$ is perturbed, shift to the right and beginning at P-1 $SK_2$ is processed in the same fashion until completed iii) After $SK_2$ is perturbed, shift to the right and beginning at P-2 $SK_3$ is processed in the same fashion until completed iv) Repeat until all $SK_n$ keys are perturbed in this fashion A unique Whitenoise key from a transmitted session key K by perturbing the sub-key structure schedule has been created. The key stream that will be used is created by XOR'ing corresponding bits of $SK_1$ through $SK_n$, (vertically) starting at a different offset. See FIG. 12 for the key generation process. A performance result from this process is the ability to create enormous, highly-random key streams while minimizing the footprint/storage required on the device or endpoint. It also minimizes the amount of key information K that needs to be transmitted to the smaller sized key lengths in use today.

In this fashion sub-keys have been perturbed to create keys that cannot be guessed or broken while giving Whitenoise keys the same size or similar sized footprint of other crypto or key options. Each implementation can have a unique key schedule. The key schedule has then been perturbed to a unique Whitenoise implementation and is ready for use. This has accomplished several things. Man-in-the-Middle can have the distributed key schedule but is never privy to the offsets or the session key that in turn generates the unique endpoint key. This technique also simplifies manufacturing and storage issues (for example in SCADA environments) and is still able to generate unique keys.

Universal Identifier Perturbing Key Creation Method (with and without Password)

There will be contexts where the end users will find a balance between the use of dongle based keys (external peripheral devices like USB flash memory or similar RSA authentication dongles) and not requiring the user/end point to have an extra physical device. In this context, a key schedule on a device/end point can be perturbed to create a unique key with unique key stream output by using a device/end point specific identifier like a MAC or NAM number. That number is read, modified if desired by running it through a one-way function, and this result is used to perturb a device/end point key schedule, in the manner explained above, to create a device specific key with additional layers of abstraction. Additionally, at devices or end points where there is human interaction, this technique can also deploy the use of a password (the private key is known only to the user) and the universal identifier number to then perturb the key schedule. Note that endpoints and servers must use secure key exchange methods to distribute these keys to other endpoints and each other for communications. Note that while the use of a password might be the weakest security link if robust passwords are not used, any security concerns are mitigated against by the use of DIVA and its continuous authentication and detection abilities.

Prevention of Man-in-the-Middle Attacks (Hybrid and Otherwise)

The above techniques prevents Man-in-the-Middle attacks by using legacy PKI or other secure distribution mechanisms to securely transmit offset or key information of which Man-in-the-Middle is unaware of or not privy to. Dynamic Identity Verification and Authentication may also prevent Man-in-the-Middle attacks without the need for exchanging such a key and/or offset, or without using PKI/SSL/Diffie-Helman to transmit key or offset information. This is because regardless of whatever information is captured by the Man-in-the-Middle, he does not have the correct physical key of the user or device. If MiM has the physical stolen key then the endpoint being compromised does not have a key to get on the system (so it is not Man-in-the-Middle attack). If there is a physical loss of a key, the theft/loss is reported and the systems administrator disables the account. If the unique key information was copied onto a different device, the key will not function because the correct universal identifier is required to decrypt and use the key. And still assuming that the MiM interloper can get on the system, this presence will be identified and dealt with by DIVA because two identical keys with different (out of sync) offsets would be detected and disabled.

A Man-in-the-Middle attack presumes that endpoints A and B are on the system simultaneously and that the interloper C is capturing transmitted information and redirecting it whereby C pretends to endpoint A that he is B, and pretends to endpoint B that he is A. In a unilateral DIVA deployment where just the end-point, or the client and the proxy, have the DIVA key, the interloper C can bypass A and B (be outside the system) to hack into a website or server, and directly steal login, key, and other security metrics. They can then login into the site as a different person/device. This is a different kind of security hole that needs to be addressed by other means such as firewalls, intrusion detection, storage of encrypted user information etc. or for the server/site itself to adopt using DIVA and creating a two-way authentication relationship between server/site and the endpoint/client. Such an attack approach is not a Man-in-the-Middle attack but it would be identified and dealt with nonetheless by DIVA.

In the above scenario the DIVA users have deniability (repudiation) of a purchase or activity on a site because there is no logged activity for such a situation on their DIVA key or on a proxy monitoring such activity. The breach is still identified and deniability or repudiation for the client is established.

Dynamic Identity Verification and Authorization [DIVA]:

The fundamental characteristic of Dynamic Identity Verification and Authorization and the different functions it serves is the ability to generate and compare tokens (key segments) that have never yet been created or transmitted. These and other similar DIVA techniques are ideal for identity verification, history logging and deniability or non-repudiation, Internet based secure payment topologies and secure site access, SCADA topologies etc. (but not restricted to that).

DIVA encompasses the following abilities:

A. Stateful Two-Way and One-Way Authentication

Two-way authentication means that each endpoint can request and send authenticating segments of data or offsets. This means that each endpoint has key generation capability. One-way authentication means that only one endpoint (server/site) has key generation capacity. The server then writes back to the endpoint subsequent segments of key stream data that have not yet been used (and delivers this data chunk securely or otherwise). On the next session, the server/site compares the actual data at the endpoint to the data they can generate using the endpoint's key structure and current offset.

Currently, authentication of a network user occurs once at login. When an interloper hacks into a "secure" network, the interloper is free to roam around unnoticed. With DIVA, the key stream is polled throughout the session to continually identify and verify that the correct user is on the network. It is possible to incorporate transmission of session keys, use of time stamps etc. to increase the security of initial network access (login) and then DIVA continues to authenticate from there.

B. Stateful Detection

The offsets of the key streams must remain in sync between the endpoint and the server. If an interloper manages to steal a key, or gain network access, then the offsets between the server, the legitimate endpoint, and the interloper become out of sync. There are only two outcomes: 1) The legitimate owner uses his key/card first and the segment of random key data (or offset) is updated on the legitimate card. The thief then uses the stolen key/card and it won't process because the 1 k data segment (or offset) does not match between the stolen key/credit card and the server. The account is immediately disabled. 2) The thief uses the stolen key/card first successfully. The next time the card holder uses their card the transaction is refused because the stolen card has been updated with a new offset or segment of data, the offset on the server database has been updated, but not segment of data or offset on the legitimate card. Theft has been identified. The account is immediately disabled. Where the theft occurred is known because of the previous transaction.

C. Automatic Revocation

The inherent intrusion detection is simply continuing to monitor that offsets and key segments (tokens) always remain in sync. This is a simple comparison of offset numbers or sections of random data. Without any human intervention, the instant out of sync offsets are detected then the account is frozen and that key is denied network access. It does not require going to outside parties, revocation lists etc. A system administrator can remediate or deal with any situation without worry of continued or ongoing malfeasance D. Authorization/DRM The assignment and monitoring of permissions and usage rights are accomplished by using different portions of the key stream in the same fashion as authentication.

While a number of exemplary aspects and embodiments have been discussed above, those of skill in the art will recognize certain modifications, permutations, additions and sub-combinations thereof. It is therefore intended that the invention includes all such modifications, permutations, additions and sub-combinations as are within their true spirit and scope. There are many obvious topological configurations possible by changing where the different components of key creation and storage, authentication, detection and revocation occur between a client, server, person, device or a proxy. Individual components may be used in other network topologies for additional layers of security abstraction.

What is claimed is:

1. A method of encrypting a communication between a first source computer and a second destination computer, wherein said source and destination computers are each provided respectively with first and second private distributed keys, each associated with a first and second unique private key identifier, wherein a key storage server is provided with said first and second private distributed keys, each associated with said first and second unique private key identifiers, said method comprising:
  i) providing said key storage server, said key storage server being provided with said first and second private distributed keys, each associated with said first and second unique private key identifiers;
  ii) said source computer sending a first request to said key storage server for a session key;
  iii) said key storage server identifying said source computer and locating its associated first private distributed key;
  iv) said key storage server generating a unique session key for the session in question, identified by a unique session identifier;
  v) said key storage server encrypting the session key with said source computer's first private distributed key and sending the encrypted session key, with a session identifier, to said source computer;
  vi) said source computer using said source computer's first private distributed key to decrypt the session key and using the session key to encrypt said communication, which is sent to the destination computer along with said session identifier;
  vii) said destination computer receiving the encrypted communication and session identifier and sending a second request to said key storage server for the session key associated with said session identifier;
  viii) said key storage server determining from the session identifier whether it has the corresponding session key, and whether it has said destination computer's private distributed key;
  ix) if said key storage server determines from the session identifier that it has the corresponding session key, and has said destination computer's private distributed key, said key storage server encrypting the session key with said destination computer's private distributed key and communicating it to said destination computer; and
  x) said destination computer then decrypting the session key using its second private distributed key and decrypting said communication using the decrypted session key;

wherein to distribute private keys the server performs an encryption application comprising receiving a device-specific identifier from a new device, generating a unique application key and unique starting offset from the device-specific identifier, encrypting a private key with said unique key and sending said encrypted private key to the new device; and wherein key segments that have yet to be created are compared by comparing key segments ahead of the last offset to authenticate a user.

2. A method of encrypting a communication between a first source computer and a second destination computer, wherein said source and destination computers are each provided respectively with first and second private distributed keys, each associated with a first and second unique private key identifier, wherein a key storage server is provided with said first and second private distributed keys, each associated with said first and second unique private key identifiers, said method comprising:
  i) providing said key storage server, said key storage server being provided with said first and second private distributed keys, each associated with said first and second unique private key identifiers;
  ii) said source computer sending a first request to said key storage server for a session key;
  iii) said key storage server identifying said source computer and locating its associated first private distributed key;
  iv) said key storage server generating a unique session key for the session in question, identified by a unique session identifier;
  v) said key storage server encrypting the session key with said source computer's first private distributed key and sending the encrypted session key, with a session identifier, to said source computer;
  vi) said source computer using said source computer's first private distributed key to decrypt the session key and using the session key to encrypt said communication, which is sent to the destination computer along with said session identifier;
  vii) said destination computer receiving the encrypted communication and session identifier and sending a second request to said key storage server for the session key associated with said session identifier;
  viii) said key storage server determining from the session identifier whether it has the corresponding session key, and whether it has said destination computer's private distributed key;
  ix) if said key storage server determines from the session identifier that it has the corresponding session key, and has said destination computer's private distributed key, said key storage server encrypting the session key with said destination computer's private distributed key and communicating it to said destination computer; and
  x) said destination computer then decrypting the session key using its second private distributed key and decrypting said communication using the decrypted session key;

wherein to distribute private keys the server performs an encryption application comprising receiving a device-specific identifier from a new device, generating a unique application key and unique starting offset from the device-specific identifier, encrypting a private key with said unique key and sending said encrypted private key to the new device; and wherein hacking is detected when, if a copy of a key is made, the offsets do not match between the legitimate key and the stolen key.

3. The method of claim 2 wherein said session key is encapsulated with an authentication key.

4. The method of claim 3 wherein said authentication key is Whitenoise.

5. The method of claim 2 wherein a hardware-specific identifier is used as a seed and offset to generate a device-specific key.

6. The method of claim 2 wherein said private distributed keys are Whitenoise-produced keys.

7. The method of claim 6 wherein the Whitenoise distributed private key is used as an AES session key generator.

8. The method of claim 2 wherein, when the encryption application is initiated by the new device the application key uses the device-specific identifier to decrypt the private key.

9. The method of claim 2, wherein data is encrypted in the key of the destination computer in a streaming fashion.

10. The method of claim 2 wherein the session key is encrypted with a pre-distributed AES private key, and said AES-encrypted session key is then double encrypted with a pre-distributed AES or WN authentication key to double encrypt the session key.

11. The method of claim 2 wherein a user account is revoked when hacking is detected.

12. The method of claim 2 wherein said distributed key is used as a random number generator to generate further distributed keys or session keys.

13. The method of claim 2 wherein a distributed key is used to perturb a pre-distributed key schedule at an endpoint in order to create unique new keys.

\* \* \* \* \*